US012562467B2

(12) United States Patent
Caute et al.

(10) Patent No.: US 12,562,467 B2
(45) Date of Patent: Feb. 24, 2026

(54) CONTACTLESS MODEM CABLE

(71) Applicant: Airmar Technology Corporation, Milford, NH (US)

(72) Inventors: Didier Caute, Lorient (FR); Baptiste Verneau, Clohars Carnoet (FR); Bruno Marie, Ploemeur (FR); Stephen G. Boucher, Amherst, NH (US)

(73) Assignee: Airmar Technology Corporation, Milford, NH (US)

( * ) Notice: Subject to any disclaimer, the term of this patent is extended or adjusted under 35 U.S.C. 154(b) by 82 days.

(21) Appl. No.: 18/496,569

(22) Filed: Oct. 27, 2023

(65) Prior Publication Data

US 2024/0154298 A1 May 9, 2024

Related U.S. Application Data

(60) Provisional application No. 63/422,694, filed on Nov. 4, 2022.

(51) Int. Cl.
*H01Q 1/34* (2006.01)
*H01Q 5/307* (2015.01)

(52) U.S. Cl.
CPC ............... *H01Q 1/34* (2013.01); *H01Q 5/307* (2015.01)

(58) Field of Classification Search
None
See application file for complete search history.

(56) References Cited

U.S. PATENT DOCUMENTS 6,807,127 B2 * 10/2004 McGeever, Jr. ........ B63C 11/26 367/128
8,179,327 B1 * 5/2012 Clark ....................... H02G 9/00 114/328
9,490,521 B2 11/2016 Bokenfohr et al.
(Continued)

FOREIGN PATENT DOCUMENTS

CN 203151661 U 8/2013
EP 2 828 993 1/2015
(Continued)

OTHER PUBLICATIONS

Malestrom—WiSub, retrieved from the Internet on Oct. 31, 2022 at https://wisub.com/products/maelstrom/.
(Continued)

*Primary Examiner* — Dameon E Levi
*Assistant Examiner* — Anh N Ho
(74) *Attorney, Agent, or Firm* — Hamilton, Brook, Smith & Reynolds, P.C.

(57) ABSTRACT

A marine system, and corresponding method of transmitting an electronic signal in a marine environment, includes at least one pair of mutually coupled antennas disposed physically apart from each other, such that a separation gap exists therebetween. At least one of a first and second antenna of a given pair of the at least one pair of mutually coupled antennas may be communicatively coupled with at least one of the first and second antenna of any and all other pairs of mutually coupled antennas via a non-coaxial medium. The non-coaxial medium may be a cable with antennas of the at least one pair disposed at opposing terminals thereof, to support a contactless connection between at least a first and second transceiver module.

22 Claims, 21 Drawing Sheets

(56) References Cited

U.S. PATENT DOCUMENTS

| | | | | |
|---|---|---|---|---|
| 9,729,253 | B2 | 8/2017 | Tobias et al. | |
| 10,070,032 | B2 | 9/2018 | Harada et al. | |
| 10,355,334 | B2 | 7/2019 | Bokenfohr et al. | |
| 2009/0197531 | A1 | 8/2009 | Locke et al. | |
| 2009/0208219 | A1 | 8/2009 | Rhodes et al. | |
| 2013/0321223 | A1 * | 12/2013 | Bokenfohr | H01Q 1/04 343/719 |
| 2014/0098642 | A1 * | 4/2014 | Rhodes | H04B 13/02 367/134 |
| 2014/0306852 | A1 * | 10/2014 | Peterson | H01Q 1/2216 343/709 |
| 2015/0070503 | A1 | 3/2015 | Kraeling et al. | |
| 2017/0170879 | A1 * | 6/2017 | Weaver | H04B 5/24 |
| 2018/0123232 | A1 * | 5/2018 | Shope | H01Q 1/04 |
| 2021/0143867 | A1 | 5/2021 | Moussavinik | |

FOREIGN PATENT DOCUMENTS

| | | | |
|---|---|---|---|
| JP | H10-303628 | A | 11/1998 |
| JP | 2008-048391 | A | 2/2008 |
| JP | 2011-146391 | A | 7/2011 |
| JP | 2011-166729 | A | 8/2011 |
| JP | 2011-244179 | A | 12/2011 |
| JP | 2015-144147 | A | 8/2015 |
| WO | 01/95529 | A1 | 12/2001 |
| WO | 2010/099371 | A1 | 9/2010 |
| WO | 2012/113757 | A1 | 8/2012 |
| WO | 2017/131528 | A1 | 8/2017 |
| WO | 2024/097618 | A1 | 5/2024 |

OTHER PUBLICATIONS

Abbosh et al., "Compact UHF antenna in aquatic environments for mobile sporting applications," Griffith University, 2010 IEEE Antennas and Propagation Society International Symposium.

SpotX Underwater Vision, Retrieved from the Internet on Nov. 1, 2022 at https://www.spotx.com.au/underwater-video-systems-and-rovs/drop-camera-live-underwater-gopro-video-to-tv-monitor-plotter-sounder.

Atlantic pro divers, "Suunto Multi Tank Pod for D5 and Eon Computers," Retrieved from the Internet on Nov. 1, 2022 at https://piratediver.com/suunto-multi-tank-pod-for-d5-and-eon-computers/.

PCT International Search Report and Written Opinion for International Application No. PCT/US2023/078103, entitled "Contactless Modem Cable" mailed on Feb. 21, 2024.

* cited by examiner

Lorem ipsum

CONTACTLESS MODEM CABLE

RELATED APPLICATION

This application claims the benefit of U.S. Provisional Application No. 63/422,694, filed on Nov. 4, 2022. The entire teachings of the above application are incorporated herein by reference.

BACKGROUND

It is often desirable to provide data communication between two submerged waterproof systems. However, use of electrical connections to provide such communication introduces an element of risk for potential problems, especially in an underwater environment.

SUMMARY

Long renowned for their unforgiving treatment of man-made devices deployed within their depths, marine environments can be especially harsh on electronic systems. Electrical connectors, for example, often fall prey to corrosion upon prolonged exposure to sea water, and occasionally suffer physical breakage upon encountering various hazards of the deep. It is therefore desirable to provide electronic systems, especially in marine environments, with contactless connectors to realize a more robust solution.

In some aspects of the present disclosure, a marine system comprises at least one pair of mutually coupled antennas. Each pair of the at least one pair of mutually coupled antennas includes a first antenna and a second antenna. The first antenna is disposed physically apart from the second antenna to form a separation gap therebetween. At least one of the first antenna and the second antenna of a given pair of the at least one pair of mutually coupled antennas is communicatively coupled with at least one of the first antenna and the second antenna of any and all other pairs of mutually coupled antennas via a non-coaxial medium. Such a non-coaxial medium may include cables such as twisted-pair or other forms of paired cables that eschew a traditional coaxial design. For example, the non-coaxial medium may be or resemble a telephone cable. Alternatively, the non-coaxial medium may simply be an absence of any type of cable, such as in cases of a direct wireless connection. The system further includes a first transceiver module and a second transceiver module mutually configured to facilitate transmission of a signal across the separation gap via the pair of antennas. A carrier frequency of the signal exists at less than 300 MHz for non-limiting example. Alternatively, the carrier frequency of the signal may be more than 3 GHz, such as approximately 6 GHz, or another carrier frequency that is more than 3 GHz for non-limiting examples.

The separation gap, in operation of the system, may be occupied by a non-metallic gap material.

In some aspects of the system, the at least one pair of mutually coupled antennas includes a first pair and a second pair. In such aspects, the non-coaxial medium includes a waterproof cable assembly including a first connector and a second connector. The first connector may be electrically coupled with the second antenna of the first pair of antennas, and the second connector may be electrically coupled with the second antenna of the second pair of antennas. In some such aspects, the first transceiver module is electrically coupled with the first antenna of the first pair of antennas, and the second transceiver module is electrically coupled with the first antenna of the second pair of antennas.

Further to such coupling of connectors, antennas, and transceivers, in some aspects, the system includes at least one additional transceiver module. In such aspects, the at least one pair of mutually coupled antennas may further include at least one additional pair. Furthermore, in such aspects, each transceiver module of the at least one additional transceiver module may respectively be electrically coupled with a corresponding first antenna of the at least one additional pair of antennas. Still further, in such aspects the waterproof cable may include at least one additional connector, such that each connector of the at least one additional connector is respectively electrically coupled with a corresponding second antenna of the at least one additional pair of antennas. The waterproof cable assembly may include a twisted-pair cable, a paired cable commonly used in telephone applications, or another non-coaxial cable.

In some aspects of the system, the at least one pair of mutually coupled antennas includes a given pair of antennas. The first transceiver module may be electrically coupled with the first antenna of the given pair of antennas, and the second transceiver module may be electrically coupled with the second antenna of the given pair of antennas. In such aspects, the non-coaxial medium may present as an absence of cables.

In some aspects, the system further includes at least one additional transceiver module. The at least one pair of mutually coupled antennas may include a first pair of antennas and at least one additional pair of antennas. The first antenna of the first pair of antennas may also be comprised by the at least one additional pair of antennas. The first transceiver module may be electrically coupled with the first antenna of the first pair of antennas, and thereby with the first antenna of the at least one additional pair of antennas. The second transceiver module may be electrically coupled with the second antenna of the first pair of antennas. Each transceiver module of the at least one additional transceiver module may respectively be electrically coupled with a corresponding second antenna of the at least one additional pair of antennas.

In some aspects of the system, a dimension of the first antenna and of the second antenna is smaller than one-eighth of a wavelength corresponding to the carrier frequency of the signal. In implementations wherein at least one of the first antenna and the second antenna is a circular antenna, the aforementioned dimension may be a diameter of an active portion of the circular antenna.

In some aspects of the system, the non-metallic gap material may be at least one of salt water, substantially pure water, a plastic or other polymer material, wood, and air for non-limiting examples. The first transceiver module and the second transceiver module may be respectively disposed within a first waterproof housing and a second waterproof housing.

In other aspects, a method of transmitting an electronic signal in a marine environment includes configuring at least one pair of mutually coupled antennas such that a first antenna of the at least one pair is disposed physically apart from a second antenna of the at least one pair to form a separation gap therebetween. The method further includes communicatively coupling at least one of the first antenna and the second antenna of a given pair of the at least one pair of mutually coupled antennas with at least one of the first antenna and the second antenna of any and all other pairs of mutually coupled antennas via a non-coaxial medium. The method further includes facilitating transmission of a signal, via the pair of antennas, between a first transceiver module, located on a first side of the separation gap, and a second transceiver module, located on a second side of the separation gap. The first side of the separation gap is an opposite side of the separation gap from the second side. The signal may have a carrier frequency of less than 300 MHz for non-limiting example. Alternatively, the carrier frequency of the signal may be more than 3 GHz, such as approximately 6 GHz, or another carrier frequency that is more than 3 GHz for non-limiting examples. Aspects of the method may be configured to perform or embody any one or combination of the system elements described herein.

Alternative method embodiments parallel those described above in connection with the example system embodiment.

It should be understood that example embodiments disclosed herein can be implemented in the form of a method, apparatus, system, or computer readable medium with program codes embodied thereon.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

Underwater environments are known to present significant challenges to electronic devices operating therein. However, the domain of data to be measured, transmitted, and received by such devices does not end at the water's surface. It is therefore necessary to design waterproof systems capable of operating in such harsh environments.

Electrical connections between underwater electronic modules have been devised, with mixed results. Challenges have included corrosion that may form on electrical contacts, and the possibility of electrical connectors becoming damaged due to collisions with other objects. Electrical connections are otherwise advantageous in providing a simple means to transfer power between electronic modules.

Figure 1:
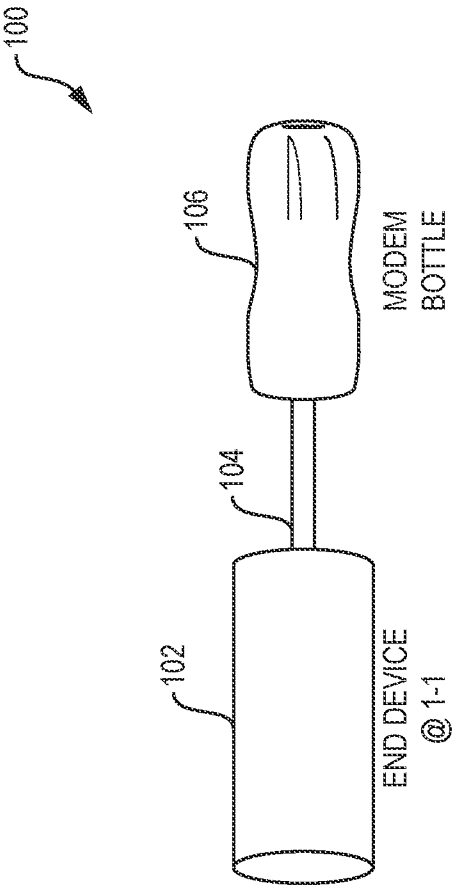
FIG. 1 (PRIOR ART)
FIG. 1 is a schematic diagram that shows an existing configuration of devices supporting underwater electronic transmission of data.

FIG. 1 is a schematic diagram that shows an existing configuration 100 wherein an end device 102 is directly connected via an electrical wire or transmission line 104 to another device, specifically, a modem disposed in a waterproof bottle 106.

Embodiments of an underwater communications system, designed to address the aforementioned challenges using contactless connections, are described herein. Some of these embodiments include a non-coaxial medium across which data is transferred between a pair of mutually coupled antenna devices. Some of these embodiments are further configured to transfer electrical power across the non-coaxial medium, even in contactless implementations.

Figure 2:
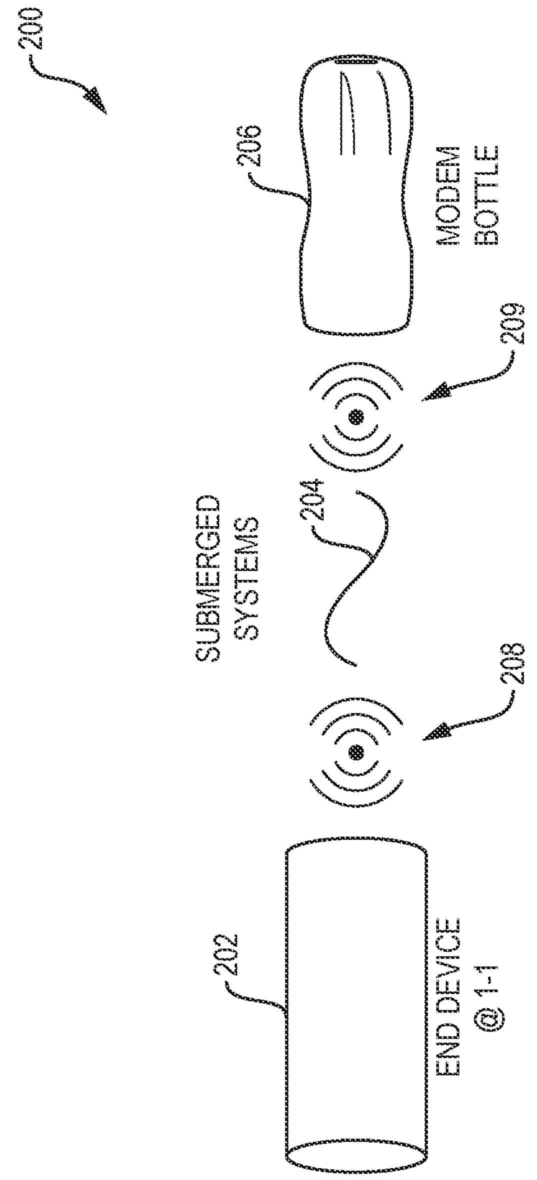
FIG. 2 is a schematic diagram showing an example of an improved system based on the system of FIG. 1.

FIG. 2 is a schematic diagram showing an example of an improved system 200 based on the system 100 of FIG. 1. An objective of system 200 is to avoid the use of electrical contacts that may be exposed to an underwater environment. To accomplish this objective, wireless capabilities of submerged devices may be used to effect communication of data through the underwater environment, including over a waveguide such as a cable. The end device 202 can be seen in FIG. 2 to be wirelessly connected across a first gap 208 to an electromagnetic waveguide such as a cable 204, which in turn is wirelessly connected across a second gap 209 to an underwater modem device 206. The first 208 and second 209 gaps may be water gaps. The cable 204 may be a non-coaxial cable such as a telephone cable. In some embodiments, the cable 204 is absent, and the first 208 and second 209 gaps thus together form a single gap. A non-coaxial implementation of the cable 204, or an absence of the cable 204, may comprise a non-coaxial medium across which the system 200 facilitates transmission of data.

Figure 3:
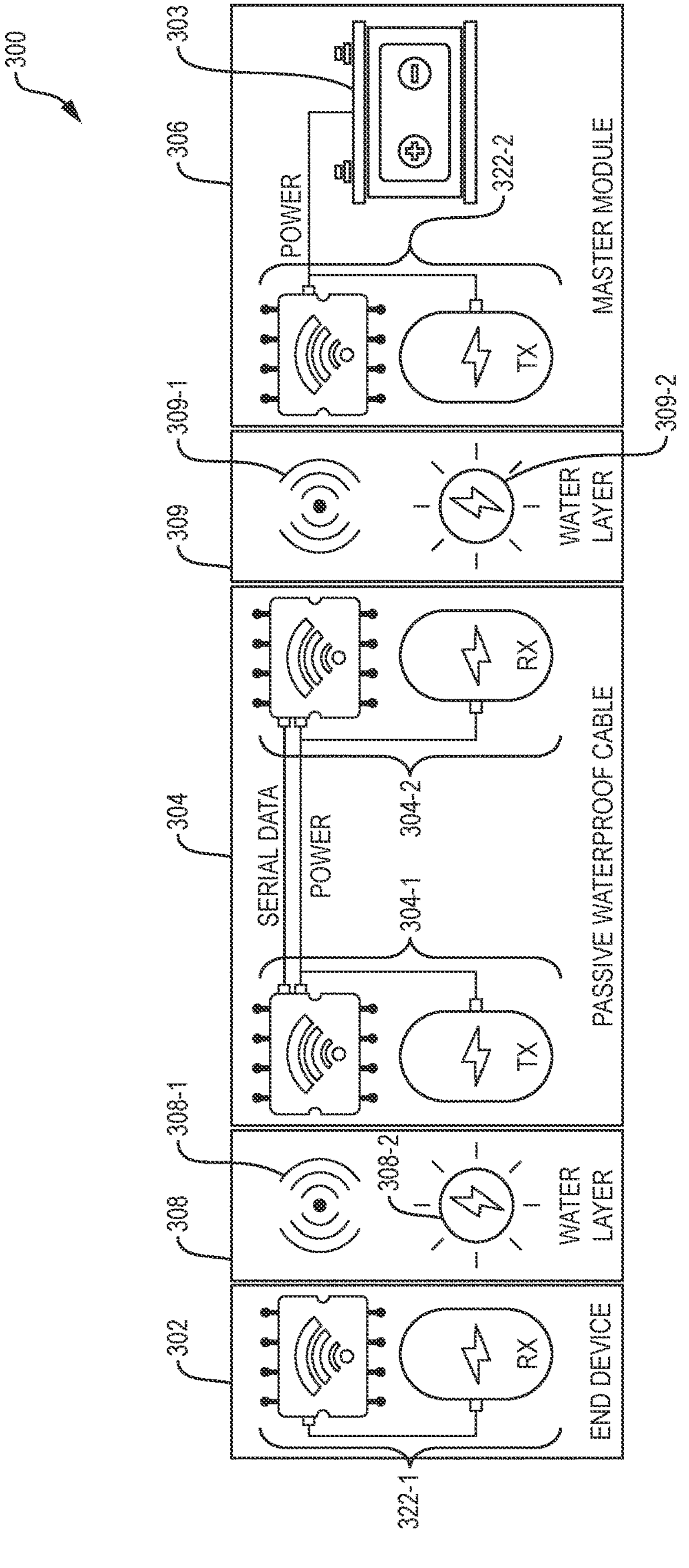
FIG. 3 is a schematic diagram of an example embodiment of a system for contactless transmission of data and power underwater.

FIG. 3 is a schematic diagram of an example embodiment of a system 300 for contactless transmission of data and power underwater. This system 300 aims to provide data communication and power between a master device 306 and end device 302 through a water layer 308, 309. Water layers 308, 309 may represent respective halves or regions of a single water layer. In this configuration 300, no electrical contact is used between modules 302, 306.

The master device, or master module 306, may provide power using an inductive antenna 322-2. Antenna 322-2 may be the only other element on a path that includes a battery 303. Antenna 322-2 may be equipped with a wireless transmission protocol, such as Bluetooth® for non-limiting example, and may be able to thereby wirelessly connect to a passive waterproof cable 304. For example, master module 306 could be an underwater sensor bottle, such as a Marport A2S sensor bottle for non-limiting example, with an inductive antenna 322-2 added to an end cap of the master module 306.

While the example embodiment of FIG. 3 may be disclosed with regard to Bluetooth technology, it should be understood that such embodiment is not limited to employing Bluetooth technology and is not limited to a Bluetooth frequency. For example, according to some embodiments, radio technology may be employed in which a carrier frequency of a signal is less than 300 MHz for non-limiting example. Alternatively, the carrier frequency of the signal may be more than 3 GHz, such as approximately 6 GHz, or another carrier frequency that is more than 3 GHz for non-limiting examples.

Continuing with reference to FIG. 3, there may be a layer of water 308, 309 between respective ends of the passive waterproof cable 304 and the master 306 or end device 302 modules. This water layer 308, 309 is preferably as thin as possible in the mechanical arrangement, to facilitate transmission of data 308-1, 309-1 and power 308-2, 309-2 across the water layer 308, 309 with minimal loss. Water layer 308 can be composed of sea water or fresh water.

The passive waterproof cable 304 is the link between end device 302 and master module 306. On the master side, the cable 304 may have an antenna 304-2, used to get power 309-2, inductively from master module antenna 322-2. The master side antenna 304-2 of the cable 304 may also include an embedded wireless communications module, such as a Bluetooth® module for non-limiting example, to which power may be supplied by an induction receiver antenna included in the Bluetooth® module. The Bluetooth® module may include a Bluetooth® low-energy interface, such as a BLEUart service (Adafruit®) for non-limiting example, which may be configured to allow the master module 306 to connect to the master side antenna 304-2 of the cable 304. The Bluetooth® module may then convert BLEUart data to serial data.

On the end device side of the cable 304, an end device side antenna 304-1 may be included. The end device side antenna 304-1 may be configured to send power inductively to supply an end device 302. The end device side antenna 304-1 may also have an embedded wireless communications module, such as a Bluetooth® module for non-limiting example, that may be configured to convert serial data to BLEUart data.

The end device 302 can be any electronic and/or sensor device, e.g., a device that may be deployed upon a fishing trawl net. The end device 302 may exclude a battery, and may further exclude an underwater acoustic data transmission link, as may be commonly deployed upon a fishing trawl net, or in other marine applications. Rather, power for the end device 302 may come via the inductive antenna 322-1 after originating at the master module 306 (e.g., at a battery 303 thereof), and the data (e.g., measurements) may be sent via BLEUart to the master module 306. Such an end device 302 can be of a very small size, and may feature low power consumption, since no underwater acoustic data transmission link is required therein.

FIGS. 4A-4D are schematic diagrams of four respective example arrangements **400*a*, 400*b*, 400*c*, 400*d* of components of a system for contactless transmission of data and power underwater. An underwater contactless passive cable connection may include at least two active modules 402, 406, 407, and a passive physical medium 404*a*, 408*a*, 409*a*, 408*b*, 404*c*, 405, 408*c*, 409*c*, 411, 408*d* between each active module 402, 406, 407. The active modules 402, 406, 407 and passive media 404*a*, 408*a*, 409*a*, 408*b*, 404*c*, 405, 408*c*, 409*c*, 411, 408*d* each include communication devices 416-1, 417-1, 416-2, 417-2, 416-*n*, 417-*n*, 404*a*-1, 404*a*-2, 422*a*-1, 422*a*-2, 422*b*-1, 422*b*-2, 404*c*-1, 404*c*-2, 405-*n*, 422*c*-1, 422*c*-2, 422*c*-*n*, 422*d*-1, 422*d*-2, 422*d*-*n* which are operable to provide wireless communication when they are in a coupled state. The wireless communication may use a wireless signal whose carrier frequency is lower than, for example, 300 MHz. It should be noted that, while in FIGS. 4A-4D the passive physical media 408*a*-408*d*, 409*a*, 409*c* are shown to be water layers, such that communication devices 404*a*-1, 404*a*-2, 422*a*-1, 422*a*-2, 422*b*-1, 422*b*-2, 404*c*-1, 404*c*-2, 405-*n*, 422*c*-1, 422*c*-2, 422*c*-*n*, 422*d*-1, 422*d*-2, 422*d*-*n* are underwater, it is also possible for at least some of the passive physical media 408*a*-408*d*, 409*a*, 409*c*** to include other media, such as air for non-limiting example.

Figure 4A:
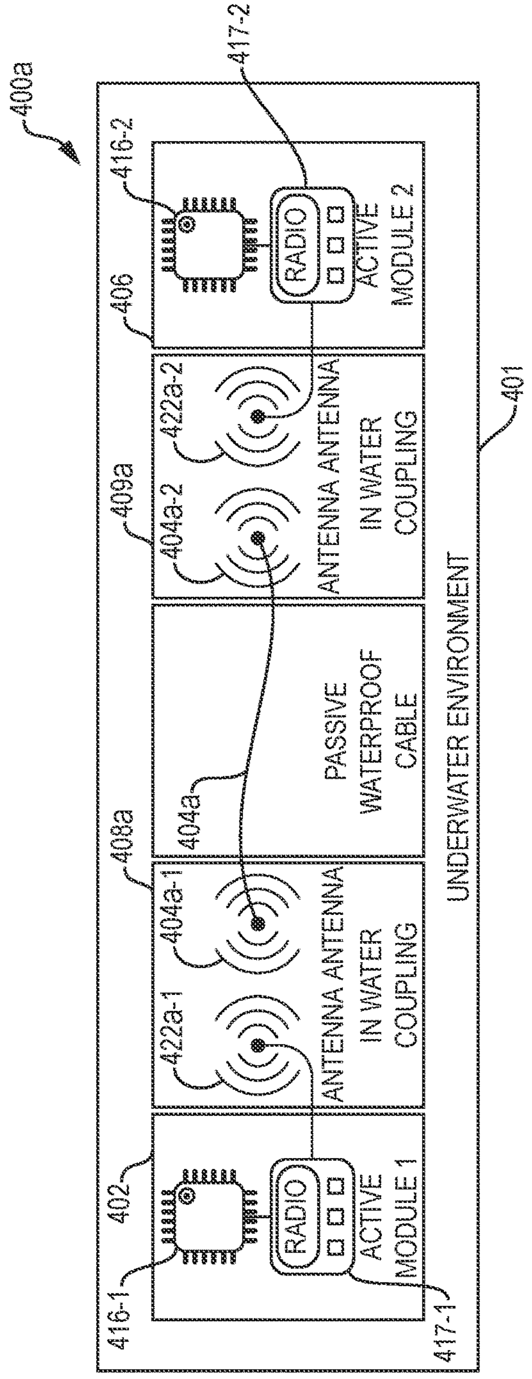
FIGS. 4A-4D are schematic diagrams of four respective example arrangements of components of a system for contactless transmission of data and power underwater.

FIG. 4A depicts an arrangement **400*a* of a system as described above, to be referred to herein as "Arrangement 1." In an underwater environment 401, a point-to-point connection is established in Arrangement 1 between active modules 402, 406 and across passive physical media including a passive waterproof cable 404*a* and in-water wireless couplings 408*a* and 409*a*. Active modules 402, 406 include respective communication circuits 416-1, 416-2 and transmit/receive devices 417-1, 417-2. Respectively attached to active modules 402, 406 are antennas 422*a*-1, 422*a*-2. Likewise attached to opposing ends of the passive waterproof cable 404*a* are antennas 404*a*-1, 404*a*-2, respectively configured to be wirelessly connected with antennas 422*a*-1, 422*a*-2**.

Figure 4B:
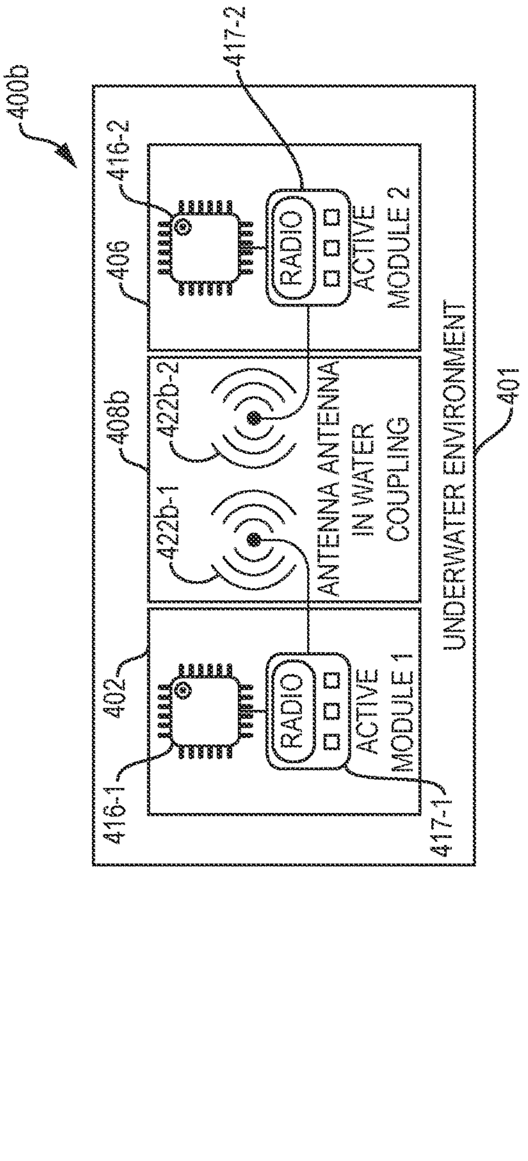

FIG. 4B depicts an arrangement **400*b* of a system as described above, to be referred to herein as "Arrangement 2." In an underwater environment 401, a point-to-point connection is established in Arrangement 2 between active modules 402, 406 and across passive physical media including in-water wireless coupling 408*b*. There may be no cable included in the passive physical media of arrangements, such as Arrangement 2. Active modules 402, 406 include respective communication circuits 416-1, 416-2 and transmit/receive devices 417-1, 417-2. Respectively attached to active modules 402, 406 are antennas 422*a*-1, 422*a*-2**, configured to be mutually wirelessly connected.

Figure 4C:
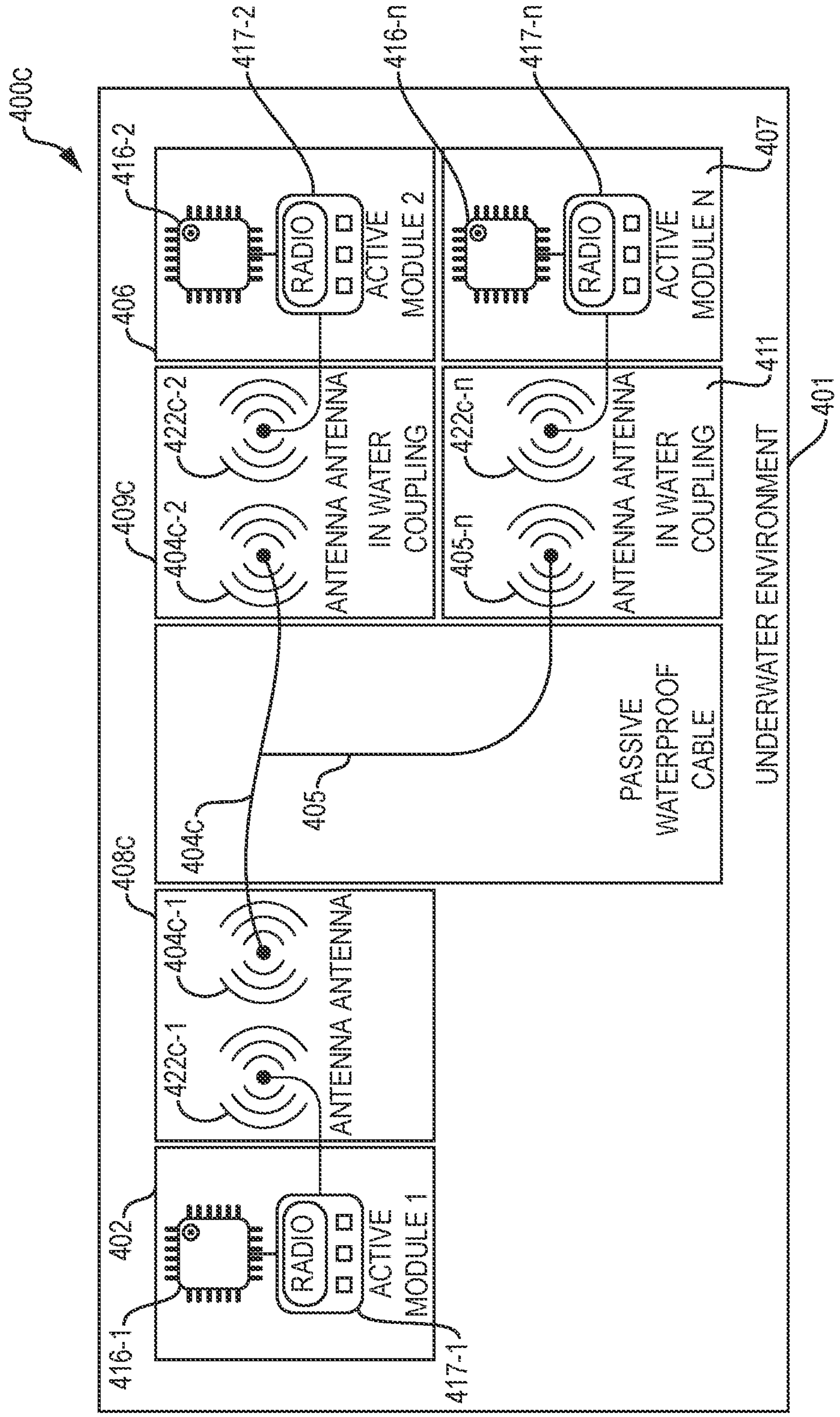

FIG. 4C depicts an arrangement **400*c* of a system as described above, to be referred to herein as "Arrangement 3." In an underwater environment 401, a multipoint, star topology network connection is established in Arrangement 3 among active modules 402, 406, 407, and across passive physical media including passive waterproof cables 404*c*, 405 and in-water wireless couplings 408*c*, 409*c*, and 411. Active modules 402, 406, 407 include respective communication circuits 416-1, 416-2, 416-*n* and transmit/receive devices 417-1, 417-2, 417-*n*. Respectively attached to active modules 402, 406 are antennas 422*c*-1, 422*c*-2, 422*c*-*n*. Likewise attached to opposing ends of the passive waterproof cables 404*c*, 405 are antennas 404*c*-1, 404*c*-2, 405-*n*, respectively configured to be wirelessly connected with antennas 422*c*-1, 422*c*-2, 422*c*-*n***.

Figure 4D:
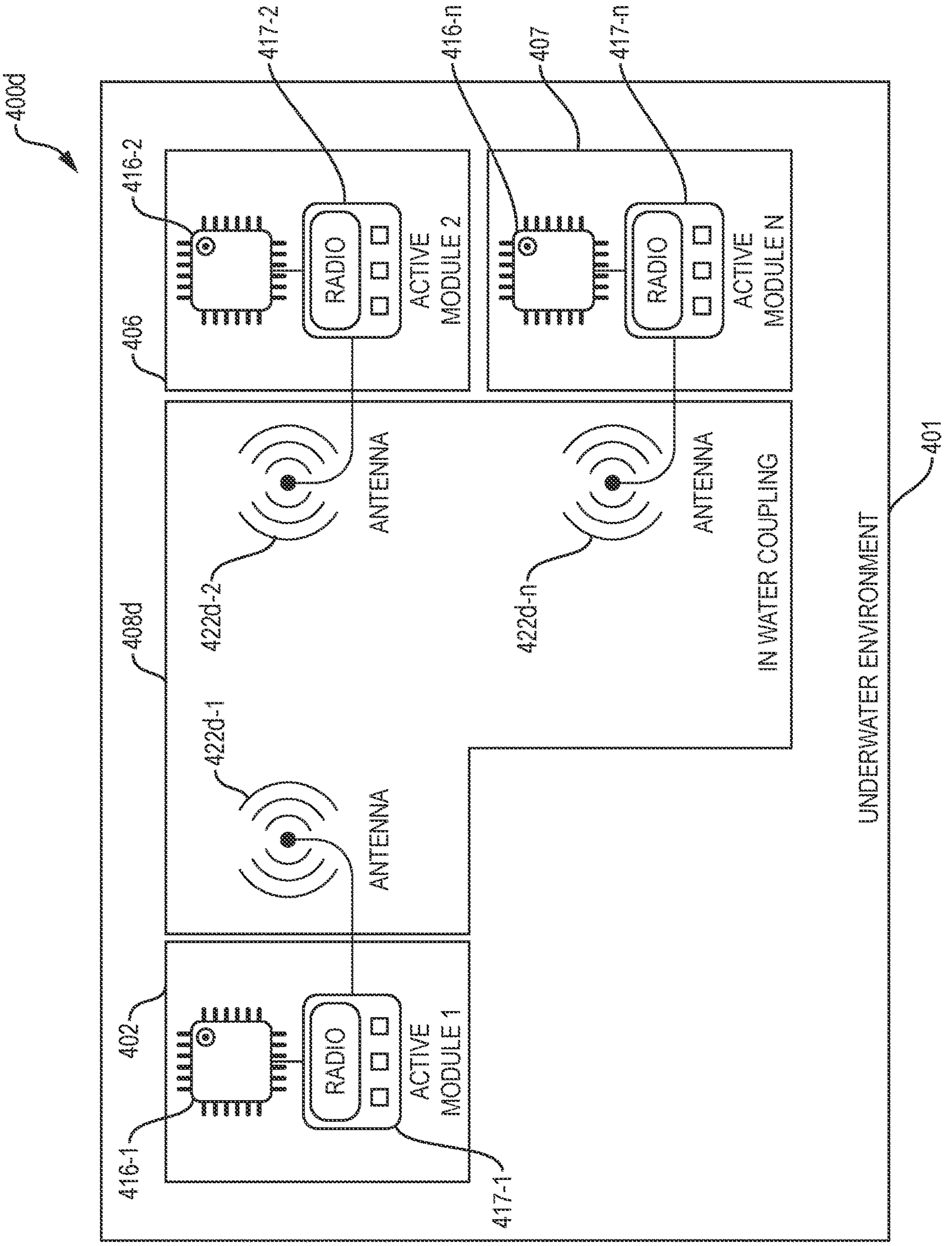

FIG. 4D depicts an arrangement **400*d* of a system as described above, to be referred to herein as "Arrangement 4." In an underwater environment 401, a multipoint network connection is established in Arrangement 4 among active modules 402, 406, 407 and across passive physical media including in-water wireless coupling 408*d*. There may be no cable included in the passive physical media of arrangements, such as Arrangement 4. Active modules 402, 406, 407 include respective communication circuits 416-1, 416-2, 416-*n* and transmit/receive devices 417-1, 417-2, 417-*n*. Respectively attached to active modules 402, 406 are antennas 422*d*-1, 422*d*-2, 422*d*-*n*** configured to be mutually wirelessly connected.

Systems, such as those having arrangements **400*a-d* as shown in FIGS. 4A-D, may be configured to function underwater, for example, in sea water or fresh water. The active modules 402, 406, 407 may be battery powered. Communication circuits 416-1, 416-2, 416-*n* may be microcontrollers. Transmit/receive devices 417-1, 417-2, 417-*n* may also be referred to herein as radio modules, and may, for example, be Bluetooth® modules. In Arrangement 2, communication between active modules 406, 407 may be classified as half duplex, bidirectional. In Arrangement 3, the network formed by the arrangement 400***c* may be described as a star-shaped network. It should be noted that the passive waterproof cable 404*a*, 404*c*, 405 may not embed any other component than antennas, or alternatively may include additional transmit/receive devices, such as Bluetooth® modules (not pictured) for non-limiting example. Devices embedded in cables 404*a*, 404*c*, 405 may be powered by energy drawn from the power being transmitted via antennas 404*a*-1, 404*a*-2, 422*a*-1, 422*a*-2, 422*b*-1, 422*b*-2, 404*c*-1, 404*c*-2, 405-*n*, 422*c*-1, 422*c*-2, 422*c*-*n*, 422*d*-1, 422*d*-2, 422*d*-*n*. The communication speed of systems described herein may be on the order of, e.g., between 1 and 10 Mb/s.

In some aspects, a communications module, such as the active module 402, may be a Marport A2S sensor bottle, or another type of underwater electronic sensor device. A communications circuit 416-1 thereof may be configured to communicate, via a transmit/receive device 417-1, with a communications circuit 416-2, 416-*n* and transmit/receive device 417-2, 417-*n* of another active module 406, 407, which may be a microcontroller circuit board, such as an Arduino board for non-limiting example. The communications circuit 416-1 may be configured to support a test firmware, thereby sending frames of data, e.g. over Bluetooth®, to the active module 406, 407. The data sent may be self-incrementing data. The frame format may be, for non-limiting example, $PMPTM,DATA1,0506,DATA2,0506,DATA3,0506*77 wherein values shown in bold are self-incrementing values. The active module 406, 407 may support a script that, when run, (i) connects the transmit/receive device 417-2, 417-*n* of the active module 406, 407 wirelessly to the transmit/receive device 417-1 of the active module 402, (ii) configures the transmit/receive device 417-2, 417-*n* of the active module 406, 407 to receive frames of data sent from active module 402, and store date of the frames of data in a memory element of the active module 406, 407, such as an SD card. A received signal strength indication (RSSI) value may be determined and logged at active module 406, 407. Alternatively, active module 406 may be configured to send frames of data to active modules 402, 407, or active module 407 may be configured to send frames of data to active modules 402, 406. In such aspects, active module 406 or 407 may be a Marport A2S sensor bottle for non-limiting example, or another type of underwater electronic sensor device. Thus, any non-sensor active module 402, 406, 407 may include a microcontroller circuit board configured to receive data sent by a corresponding sensor device.

Figure 5:
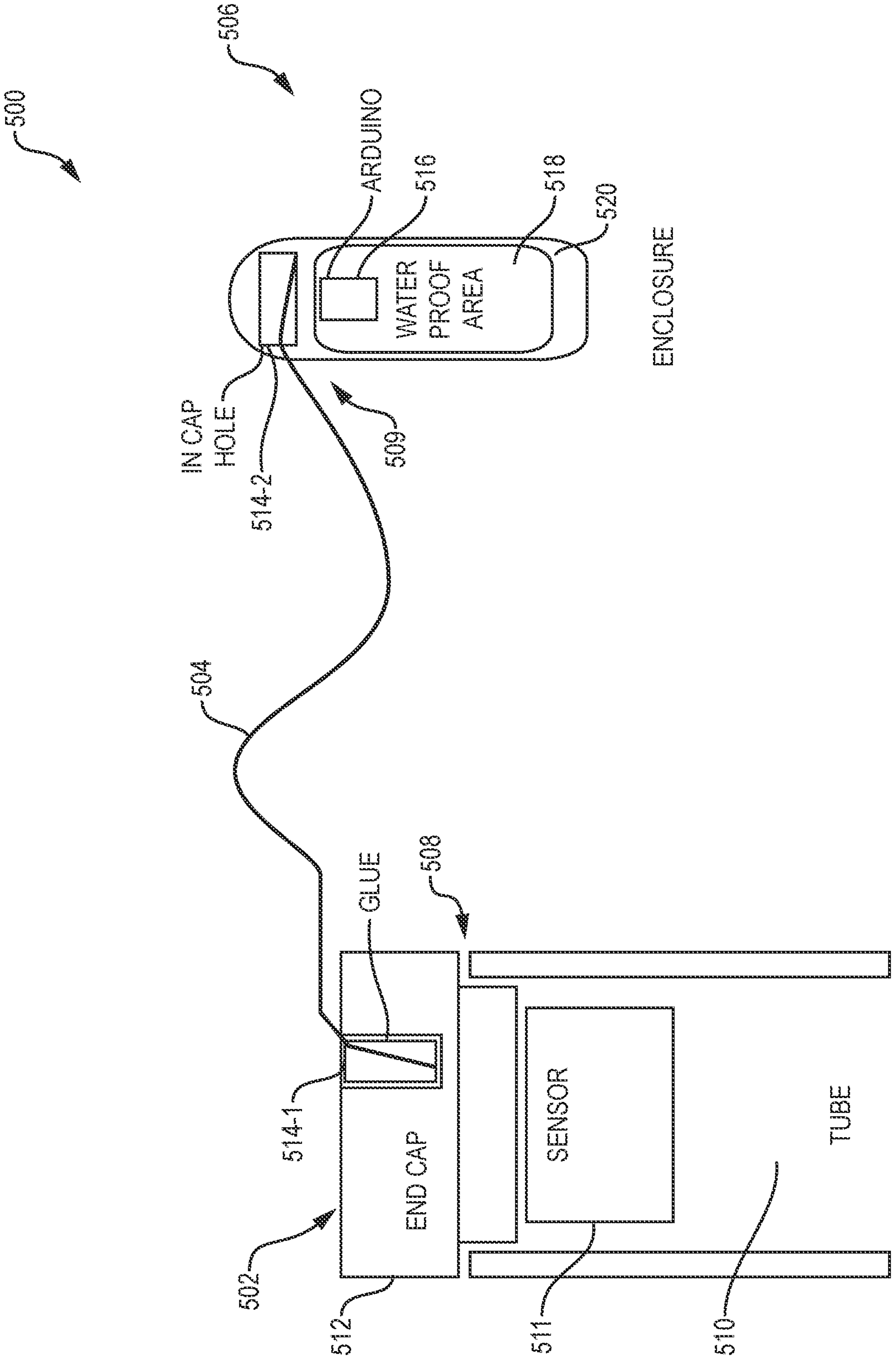
FIG. 5 is a schematic diagram of an example system for contactless transmission of data underwater.

FIG. 5 is a schematic diagram of an example system 500 for contactless transmission of data underwater, corresponding to Arrangement 1 as described above. The system 500 may, alternatively or in addition, be configured for contactless transmission of power underwater. The system 500 includes an active module 502 encompassing an in-water wireless coupling, or water gap 508. The active module 502 may comprise a tube 510 or other enclosure, a sensor or other data-producing device 511, an end cap 512, and a glue bond 514-1 connecting a passive underwater cable 504 to the end cap 512. At an opposing end of the passive underwater cable 504 may exist a physical connection 514-2 of the passive underwater cable 504 to an active module 506 via a hole in a cap of the active module 506, forming an in-water wireless coupling, or water gap 509, between connection 514-2 and a waterproof area 518 of an enclosure 520 of the active module 506. The active module 506 may further include a microcontroller circuit board, which may support, for example, an Arduino microcontroller. The passive underwater cable 504 may terminate, at each end thereof, outside of waterproof areas of enclosures 510, 520, thus creating water gaps 508, 509.

Figure 6C:
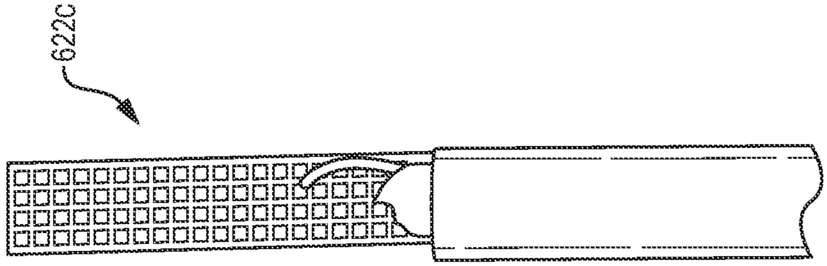
FIGS. 6A-6C are depictions of example antennas that may be used in embodiments of a system for contactless transmission of data underwater.
Figure 6B:
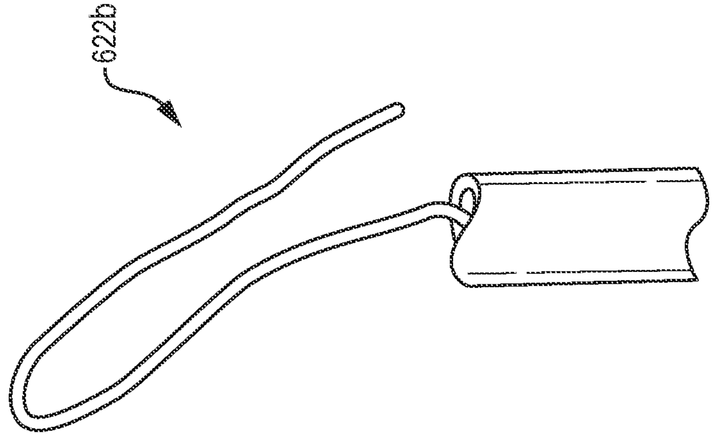
Figure 6A:
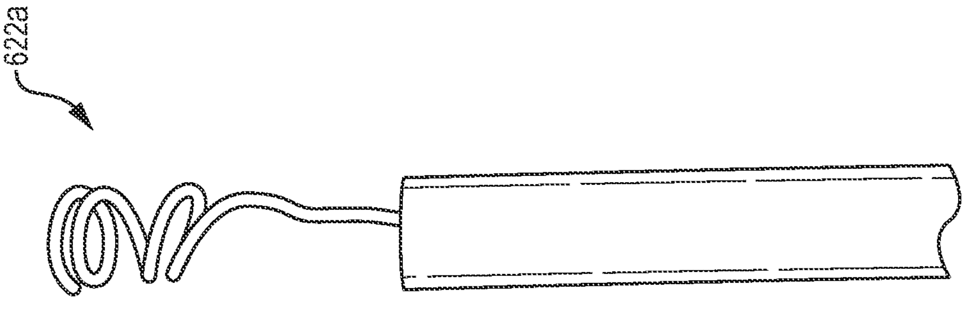

FIGS. 6A-6C depict example antennas 622*a*, 622*b*, 622*c* that may be formed at terminals of a cable, such as the passive underwater cable 504, and used in aspects of the present disclosure, including aspects of the system 500. FIG. 6A shows a coil antenna or spring antenna 622*a*. FIG. 6B shows a hairpin antenna or U antenna 622*b*. FIG. 6C shows a printed circuit board (PCB) antenna, wherein through-holes of a PCB breadboard are electrically connected in series to form an antenna. The antennas of FIGS. 6A-6C may be adapted to a Bluetooth® Low Energy (BLE) wavelength of 6 cm.

Figure 7:
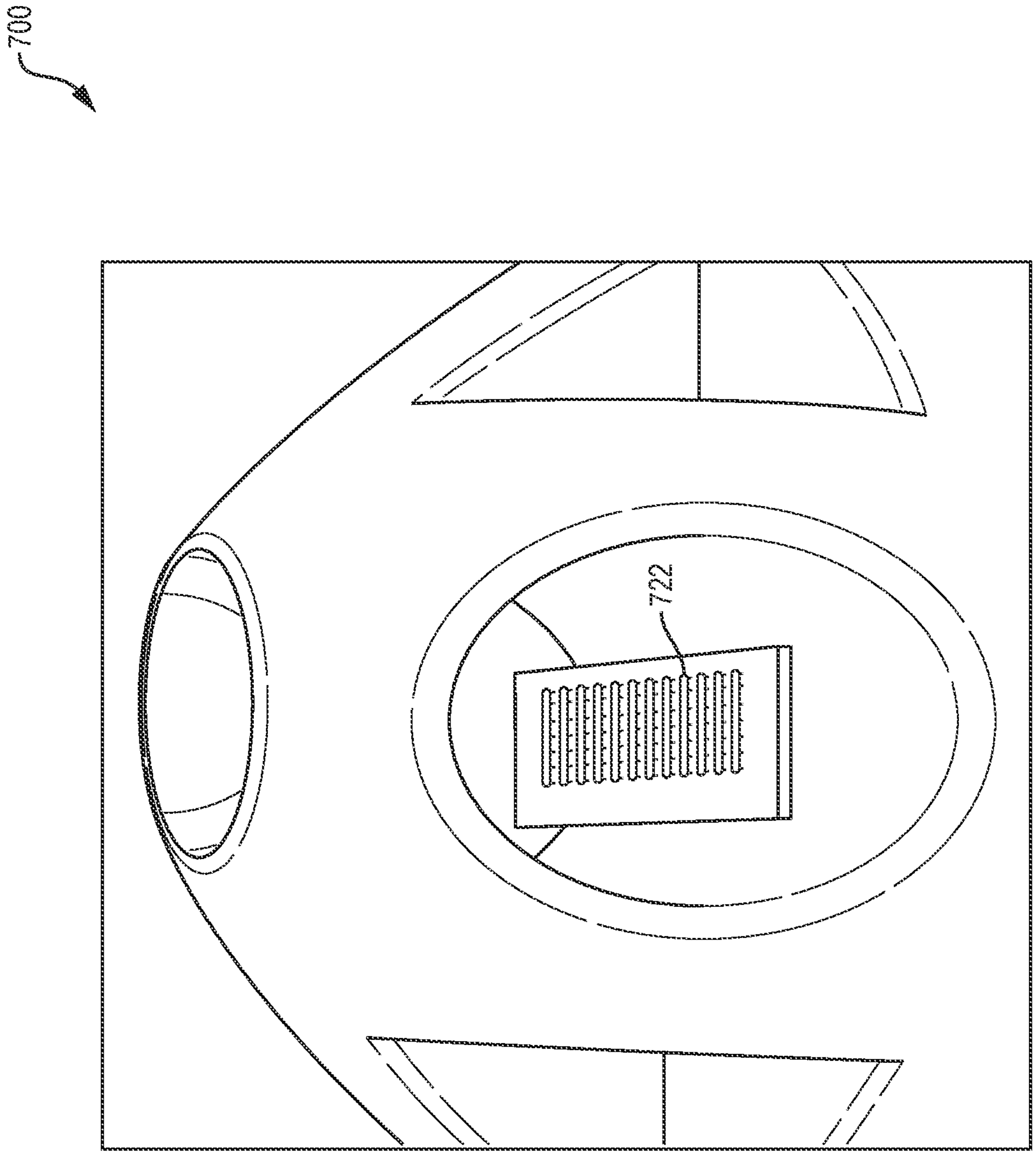
FIG. 7 is a depiction of an example fitting of an antenna that may be used in embodiments of a system for contactless transmission of data underwater.

FIG. 7 depicts an example embodiment of a PCB antenna 722 fitting in an end cap of an active module, such as active modules 502, 506. Glue, epoxy, magnets, or other adhesives or fasteners may be used to secure the antenna 722 in the active module. The adhesive or fastener used to secure the antenna 722 in the active module need not be water-tight, as a waterproof area may be separately established within an enclosure of the active module. Sensor circuits, microcontroller circuits, and transmit/receive modules enclosed within the active module may thus reside within the waterproof area established therein, while a water gap also exists within the enclosure of the active module, between the terminal of the attached cable, and the boundary of the waterproof area.

Figure 8:
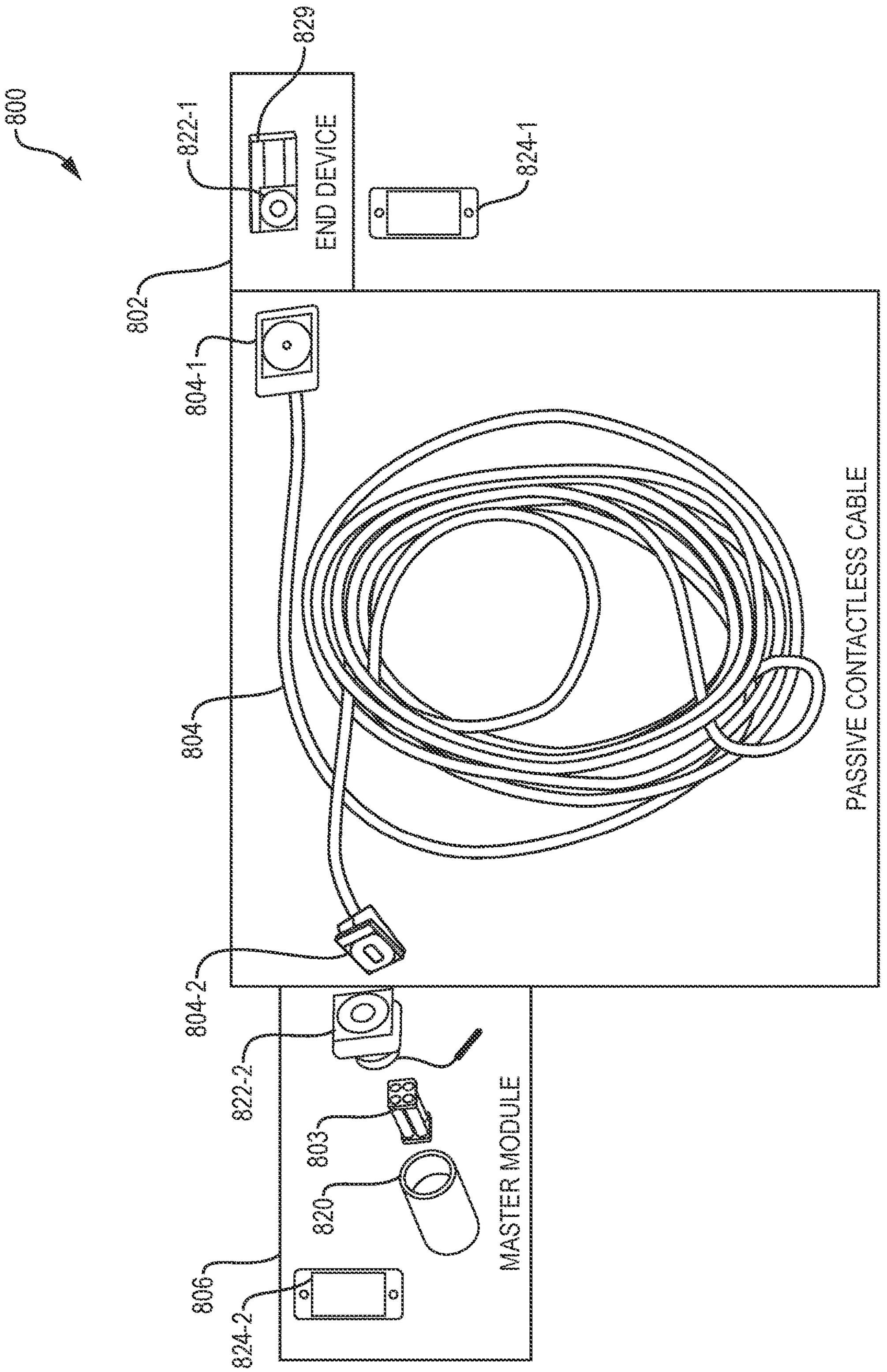
FIG. 8 is a depiction of an example system for contactless transmission of data underwater.

FIG. 8 depicts an example system 800 for contactless transmission of data underwater. In the system 800, smartphones 824-1, 824-2 are used in respective active modules, i.e., in an end device 802 and master module 806, to send and receive data through a passive underwater cable 804. The end device 802 may include an antenna 822-1 connected to an LED load that can dissipate, for example, up to 0.8 W. An array of such LEDs is disposed upon a PCB 829 on a surface opposite that of antenna 822-1, such that the array of LEDs is not explicitly shown in FIG. 8. The cable 804 may include antennas 804-1. 804-2 at opposing ends thereof. The master module 806 may include batteries 803, which may support transmission of power towards the end device 802. The master module 806 may further include an enclosure 820, and antenna 822-2. Antennas 822-1, 822-2 of the end device 802 and master module 806 respectively may connect wirelessly, and without physical contact, to antennas 804-1, 804-2 of the cable 804.

In the system 800, antennas 804-1, 804-2 of the cable 804 may include Bluetooth® modules for non-limiting example, such as Feather Express (Adafruit). Such Bluetooth® modules may be powered by batteries 803 via the antenna 822-2, and may provide BLEUart service as described above. Antennas 804-1, 804-2 may further include inductive transmitter/receiver portions (e.g., coils) that may be encased in resin, together with the aforementioned Bluetooth® modules. The cable 804 may be, for example, a four-conductor cable, such as a telephone cable, and may be capable of transmitting both power and serial data. The master module 806 may include, as battery 803, e.g. four AA batteries. The master module 806 may further include, as antenna 822-2, a Qi inductive power transmitter. The end device 802 may include an Arduino nano, which may include an inductive power receiver. The end device 802 may be configured to measure voltage from an inductive antenna 822-1, and then to light an LED as power is received from antenna 822-1. Maximum power to light eight such LEDs may be, for example, 0.8 W.

Figure 9:
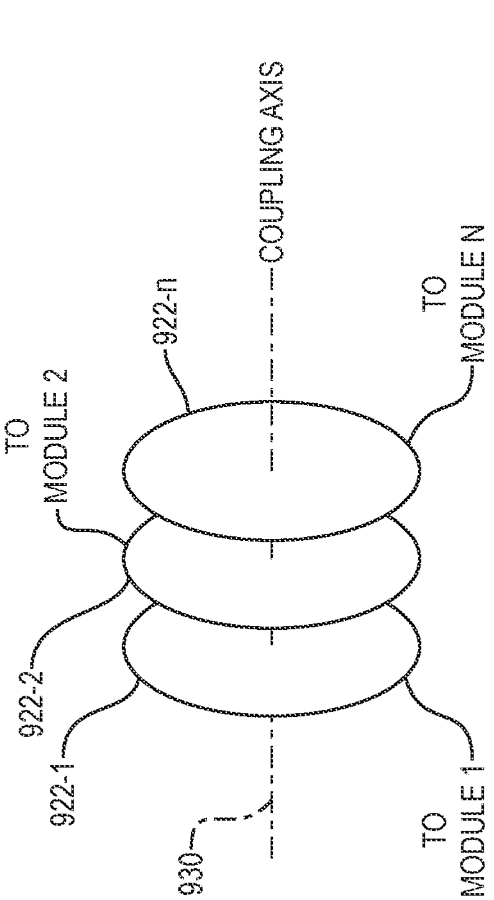
FIG. 9 is a diagram showing an example orientation of circular antennas that may be used in embodiments of a system for contactless transmission of data underwater.

FIG. 9 is a diagram showing an example orientation 900 of circular antennas, such as coil antennas 622*a*, that may fit inside a disk-shaped case. The coupling between antennas 922-1, 922-2, 922-*n* may be made by placing one or more of said antennas 922-1, 922-2, 922-*n* in front of others of said antennas 922-1, 922-2, 922-*n*. A coupling axis 930 can be seen running perpendicular to the planes of the antennas 922-1, 922-2, 922-*n*. Using orientation 900, a star topology network can be realized, such as the network of Arrangement 4 described hereinabove. The coupling in orientation 900 may be operational with the antennas 922-1, 922-2, 922-*n* immersed in water, or a water-based solution, such as salt water, with separation between the antennas 922-1, 922-2, 922-*n* being on the order of, for example, several millimeters, or one centimeter for non-limiting examples.

Figure 10:
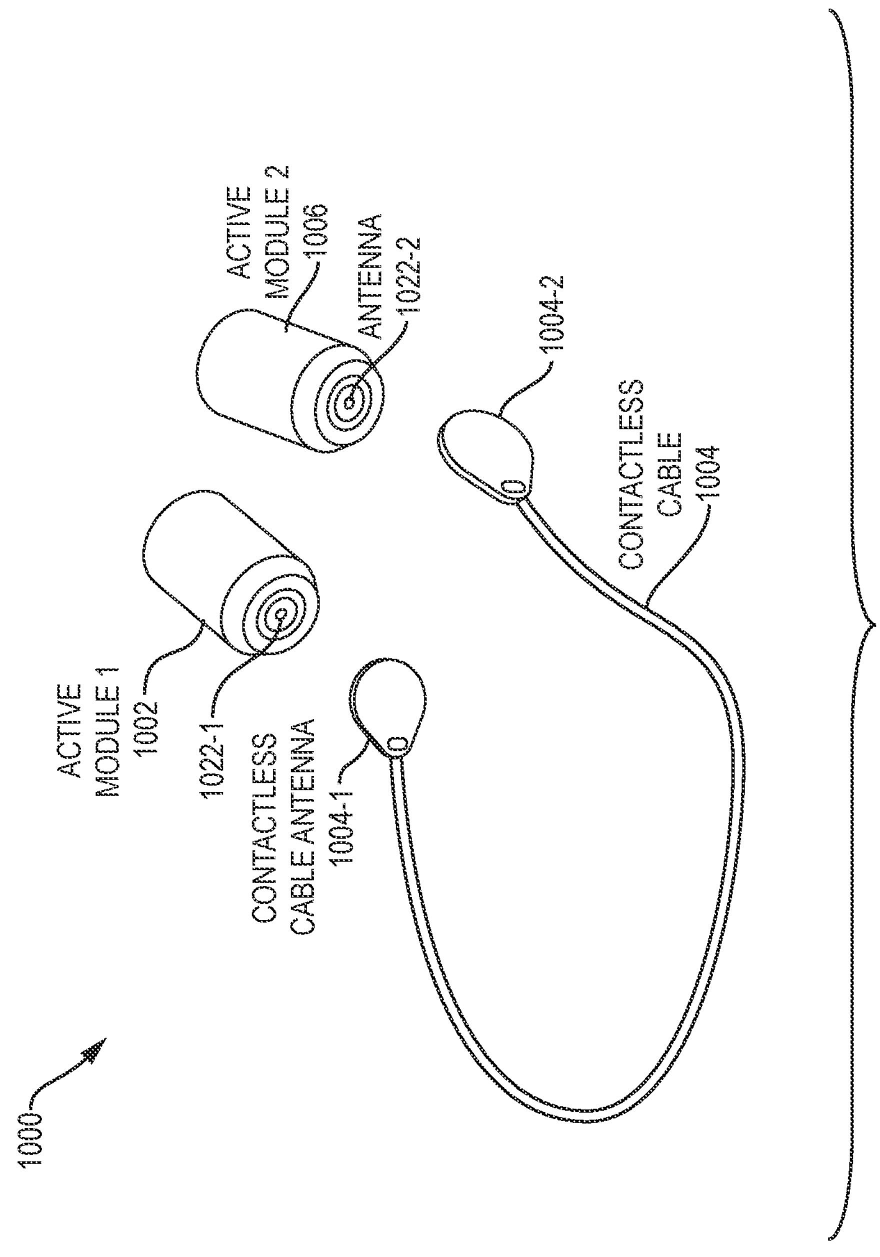
FIG. 10 is a depiction of an example system for contactless transmission of data underwater.

FIG. 10 depicts an example system 1000 for contactless transmission of data underwater, configured according to Arrangement 1 described above. The system 1000 includes active modules 1002, 1006 with respective antennas 1022-1, 1022-2. Antennas 1022-1, 1022-2 may be configured to be respectively coupled with antennas 1004-1, 1004-2 of a contactless cable 1004. Such coupling may be without electrical or physical connection, achieved wirelessly by mutual inductance between antennas 1022-1 and 1004-1, and between antennas 1022-2 and 1004-2. System 1000 is depicted in FIG. 10 on a dock in preparation for submersion in water. As such, system 1000 may be configured to function underwater as described herein. Waterproof cases of active modules 1002, 1006 may, thus, include batteries, processors, and radio modules (not pictured) in addition to antennas 1022-1, 1022-2. Active modules 1002, 1006 may be capable, by the configuration of the system 1000, of sending data to each other, and receiving data from each other.

Figure 11:
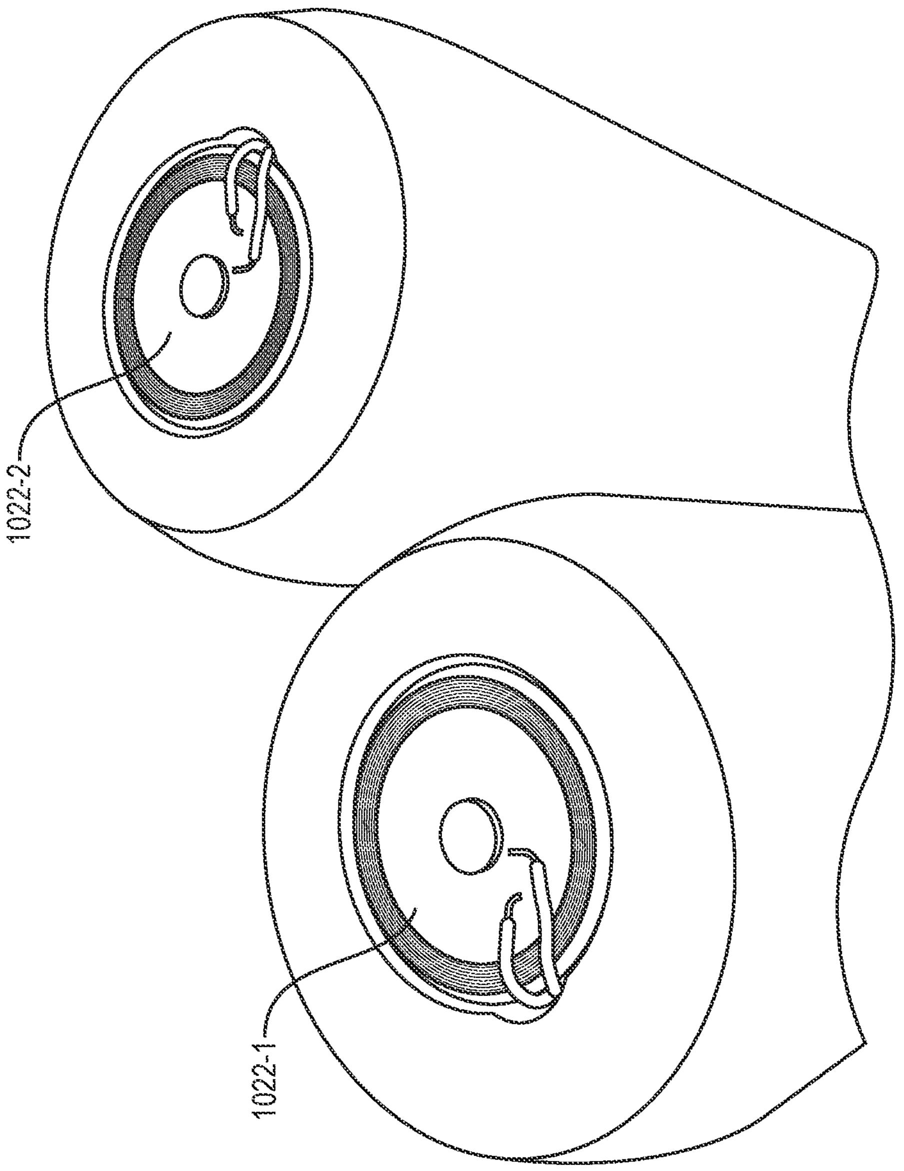
FIGS. 11 and 12 are depictions of antennas that may be used in the system of FIG. 10.

FIG. 11 is a depiction of the antennas 1022-1, 1022-2 respectively disposed upon the active modules 1002, 1006 of FIG. 10. The coil topology of antennas 1022-1, 1022-2, and wired connections to circuitry internal to active modules 1002, 1006, may be seen. Antennas 1022-1, 1022-2 are shown to be physically attached to active modules 1002, 1006 using magnets, but may also be attached using glue, epoxy, or other adhesives or fasteners.

Figure 12:
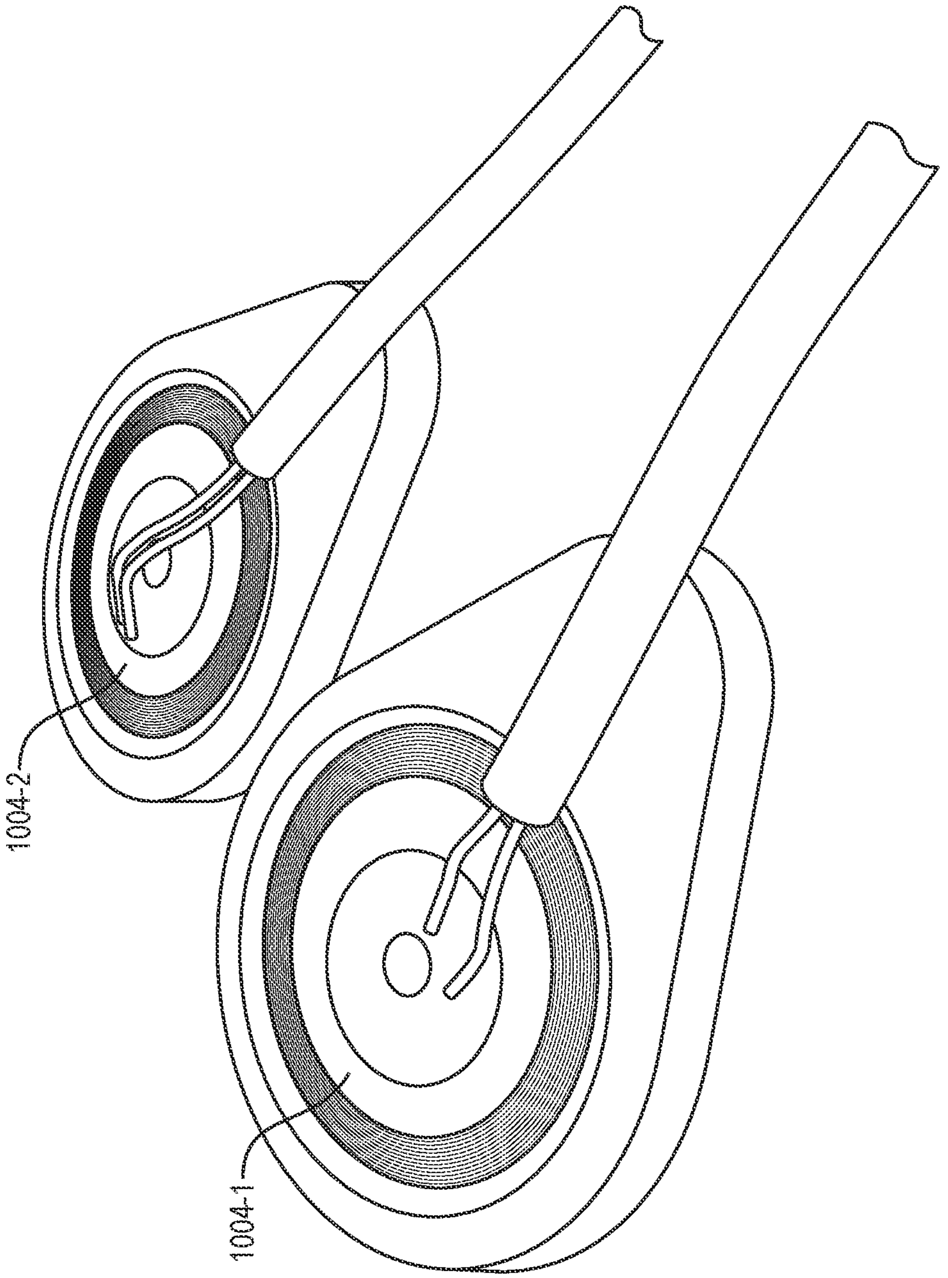

FIG. 12 is a depiction of the antennas 1004-1, 1004-2 respectively disposed upon opposing ends of the contactless cable 1004 of FIG. 10. the coil topology of antennas 1004-1, 1004-2, and wired connections to conductors internal to the cable 1004, may be seen.

Figure 13:
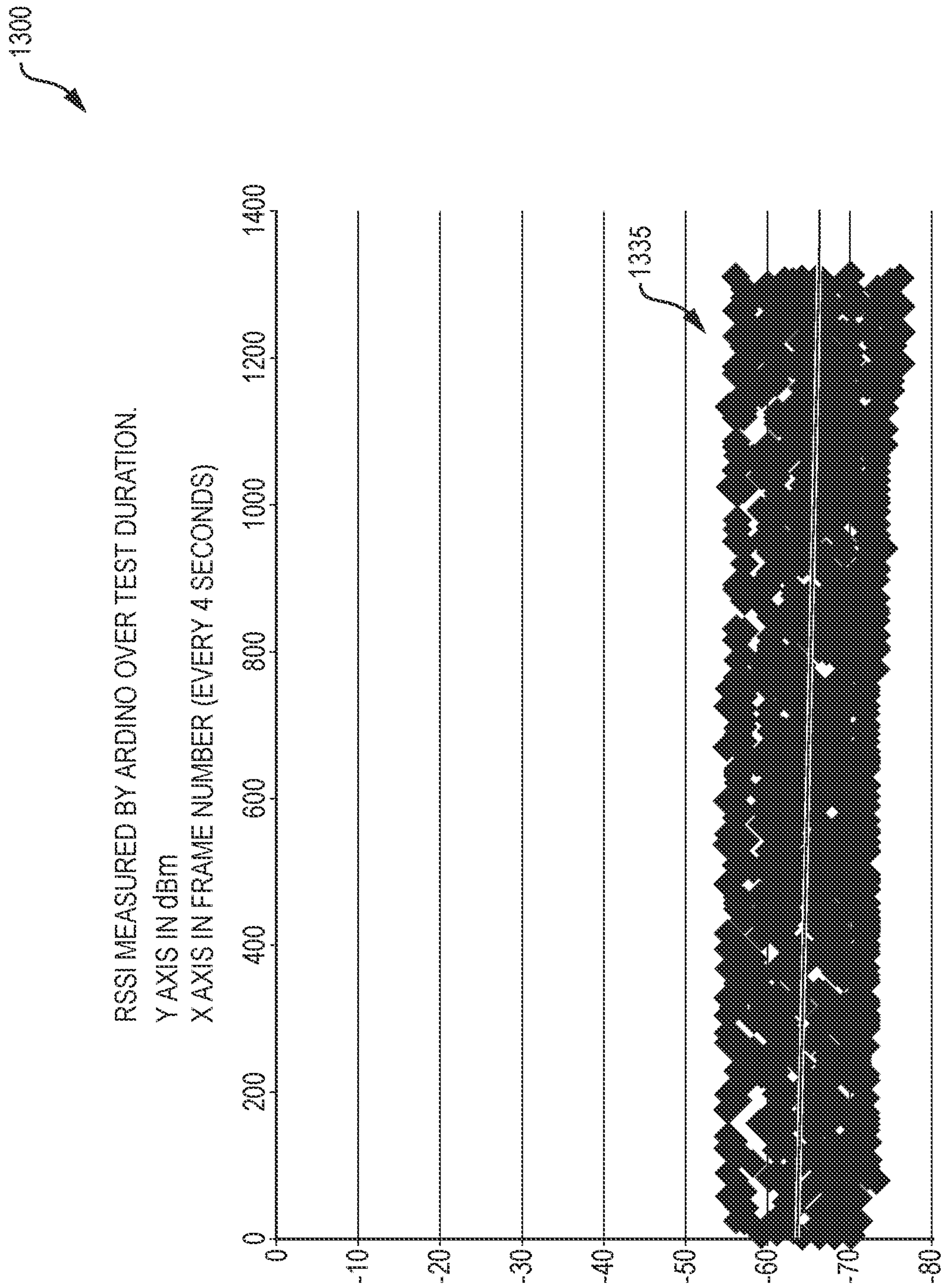
FIGS. 13, 14A-14C, and 15 are plots showing results of functional tests performed on a system configured as illustrated by FIG. 5.

FIG. 13 is a plot 1300 showing RSSI measured by an Arduino microcontroller disposed inside a waterproof module, such as the active module 506 of the system 500, for data sent by an end device, such as the end device 502, across the cable 504 and water gaps 508, 509. A Nordic nRF52840 Bluetooth® system-on-a-chip transmitter/receiver (Nordic Semiconductor) was deployed within the active module 506 and mated therein with the Arduino microcontroller. A manufacturer-provided specification of sensitivity was −95 dBm for the Nordic nRF52840; thus, the approximate RSSI level 1335 of −65 dBm shown in the plot 1300 indicates that the system 500 is functional, with about 30 dBm of headroom before the specified limit is reached. The test results illustrated in plot 1300 indicate that the contactless cable 504 is reliable over 1310 frames, with 100% of the signal received by the Arduino microcontroller, and RSSI in a workable range.

Figure 14A:
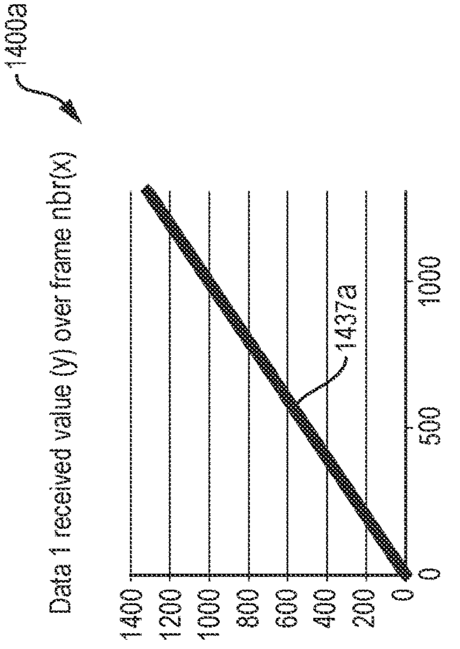
Figure 14B:
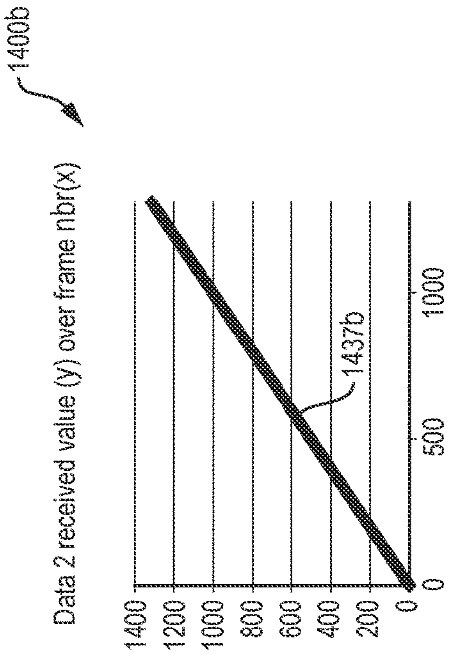
Figure 14C:
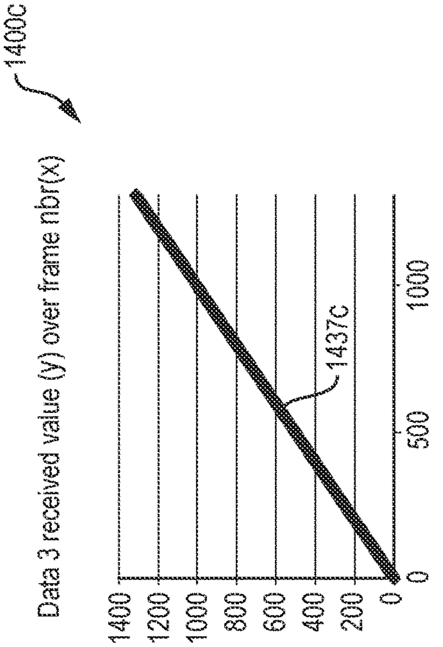

FIGS. 14A-14C are plots 1400*a*-1400*c* of a cumulative quantity of data points received by the Arduino board of system 500 versus data frame sent. Results of plots 1400*a*-1400*c* show that all 1310 frames sent by active module 502 were received at active module 506.

Figure 15:
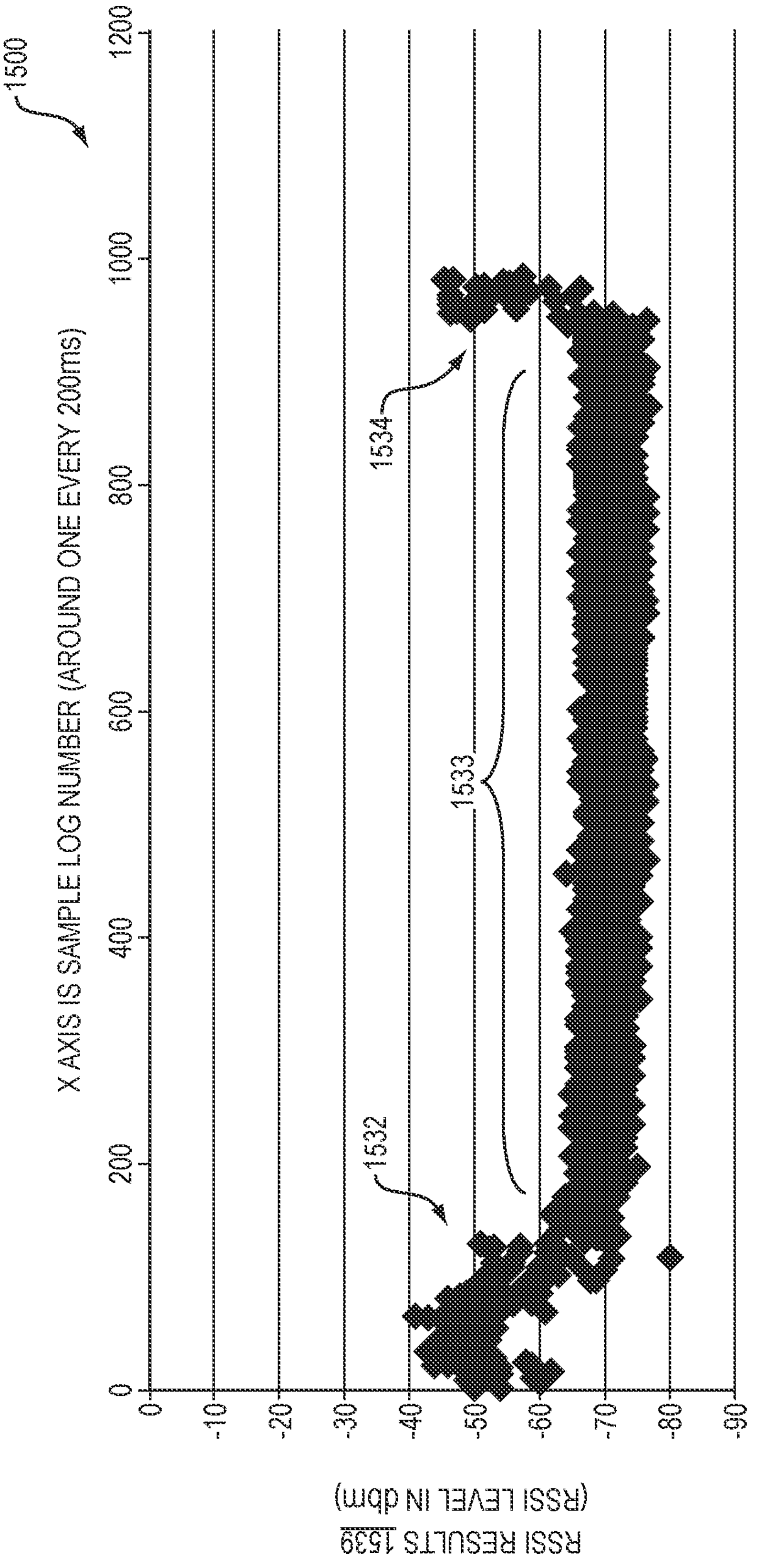

FIG. 15 is a plot 1500 showing RSSI results 1539 (RSSI level in dbm) for an example embodiment of a system for contactless transmission of data underwater, in the configuration of system 500. Data frames were sent from active module 502 to active module 506 and, approximately every 200 ms, 1000 such data frames were sent. A nominal value of −70 dBm can be seen in the RSSI results 1539, with some variation, but well within the aforementioned manufacturer-provided specification of sensitivity. In the plot 1500, the RSSI results 1539 vary because the system is started outside of water (less attenuation in air), then put into water (more attenuation), and then removed from the water at the end of the test. As such, the RSSI results 1539 include an initial region 1532 in which the RSSI level values vary due to the system being placed in the water. The central region 1533 includes RSSI level values that may be taken as a reference for an attenuation measure in the water. In the end region 1534, the RSSI level values vary as the system is removed from the water.

Figure 16:
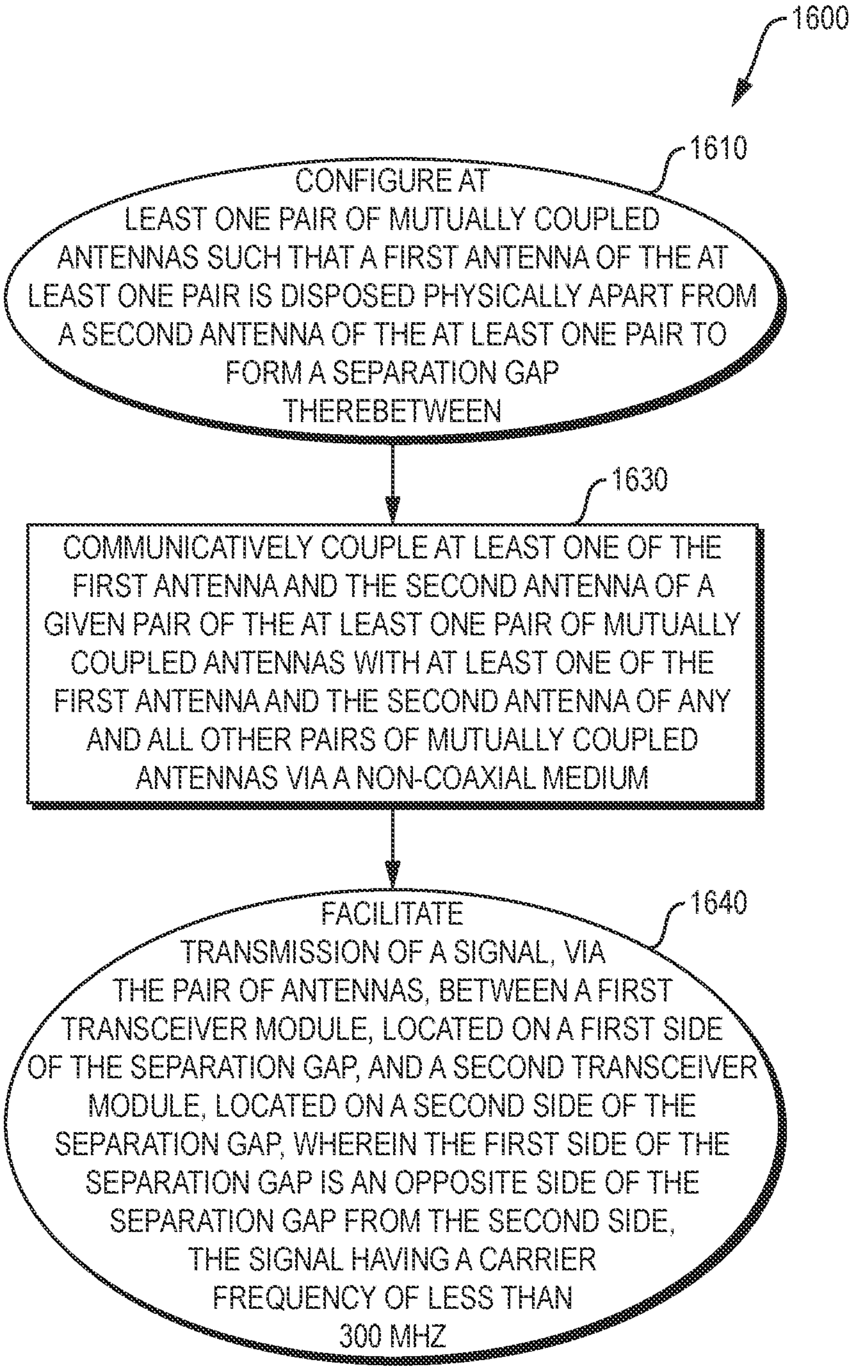
FIGS. 16-19 are flow diagrams of example methods of transmitting an electronic signal in a marine environment.

FIG. 16 is a flow diagram of an example embodiment of a method 1600 of transmitting an electronic signal in a marine environment. The method 1600 begins by configuring 1610 at least one pair of mutually coupled antennas such that a first antenna of the at least one pair is disposed physically apart from a second antenna of the at least one pair to form a separation gap therebetween. Next, the method 1600 includes communicatively coupling 1630 couple at least one of the first antenna and the second antenna of a given pair of the at least one pair of mutually coupled antennas with at least one of the first antenna and the second antenna of any and all other pairs of mutually coupled antennas via a non-coaxial medium. The method 1600 ends by facilitating 1640 transmission of a signal, via the pair of antennas, between a first transceiver module, located on a first side of the separation gap, and a second transceiver module, located on a second side of the separation gap, wherein the first side of the separation gap is an opposite side of the separation gap from the second side, the signal having a carrier frequency of less than 300 MHz for non-limiting example. Alternatively, the carrier frequency of the signal may be more than 3 GHz, such as approximately 6 GHz, or another carrier frequency that is more than 3 GHz for non-limiting examples.

Figure 17:
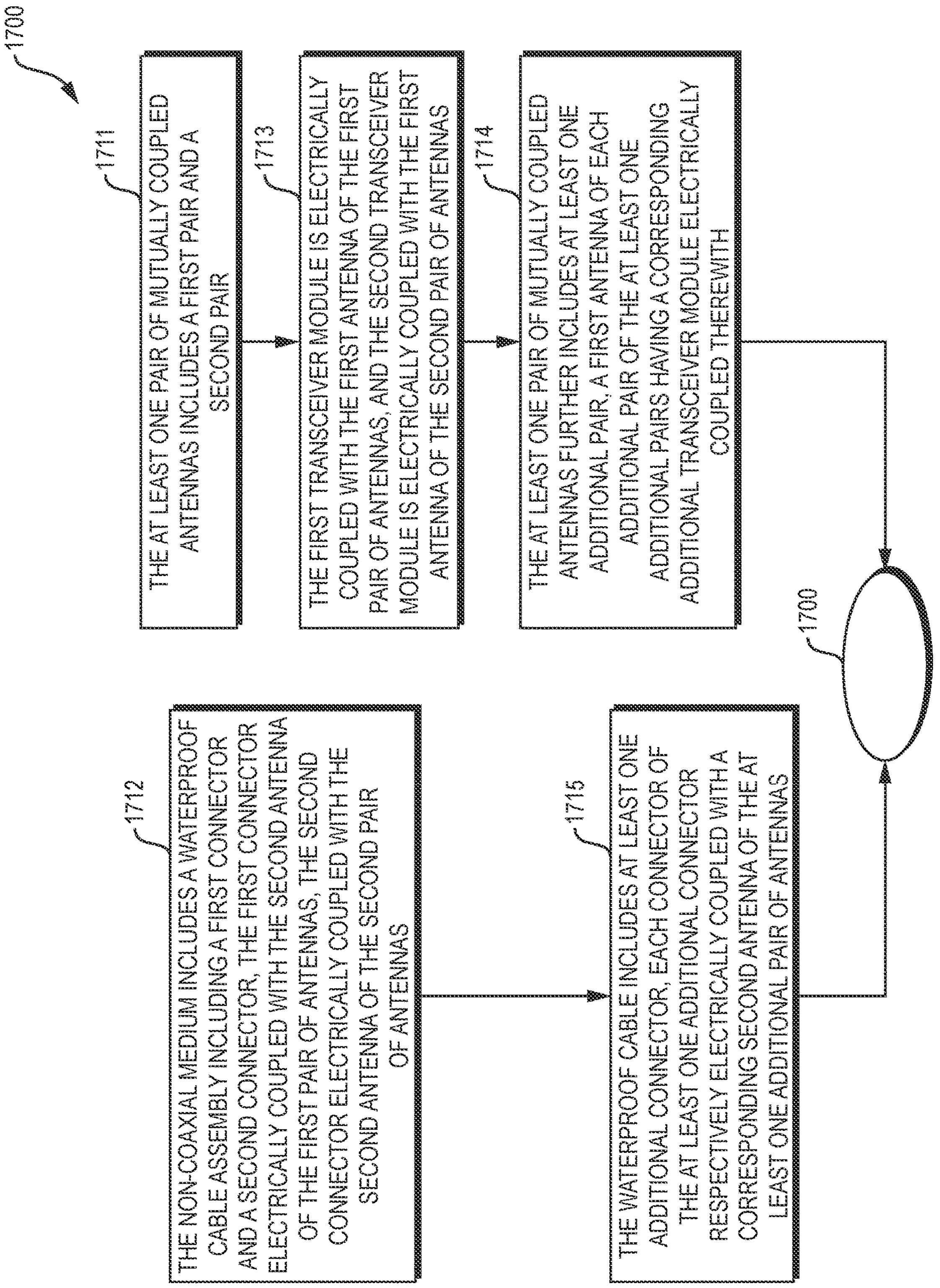

FIG. 17 is a flow diagram of an example embodiment of a method 1700 of transmitting an electronic signal in a marine environment. The method 1700 includes actions of method 1600, wherein (i) the at least one pair of mutually coupled antennas includes 1710 a first pair and a second pair; (ii) the non-coaxial medium includes 1712 a waterproof cable assembly including a first connector and a second connector, the first connector electrically coupled with the second antenna of the first pair of antennas, the second connector electrically coupled with the second antenna of the second pair of antennas; (iii) the first transceiver module is electrically coupled 1713 with the first antenna of the first pair of antennas, and the second transceiver module is electrically coupled with the first antenna of the second pair of antennas; (iv) the at least one pair of mutually coupled antennas further includes 1714 at least one additional pair, a first antenna of each additional pair of the at least one additional pairs having a corresponding additional transceiver module electrically coupled therewith; and (v) the waterproof cable includes 1715 at least one additional connector, each connector of the at least one additional connector respectively electrically coupled with a corresponding second antenna of the at least one additional pair of antennas; thereby realizing a configuration as described above with respect to Arrangement 3. A configuration, such as Arrangement 1, may be realized by omission of actions 1714 and 1715 from method 1700.

Figure 18:
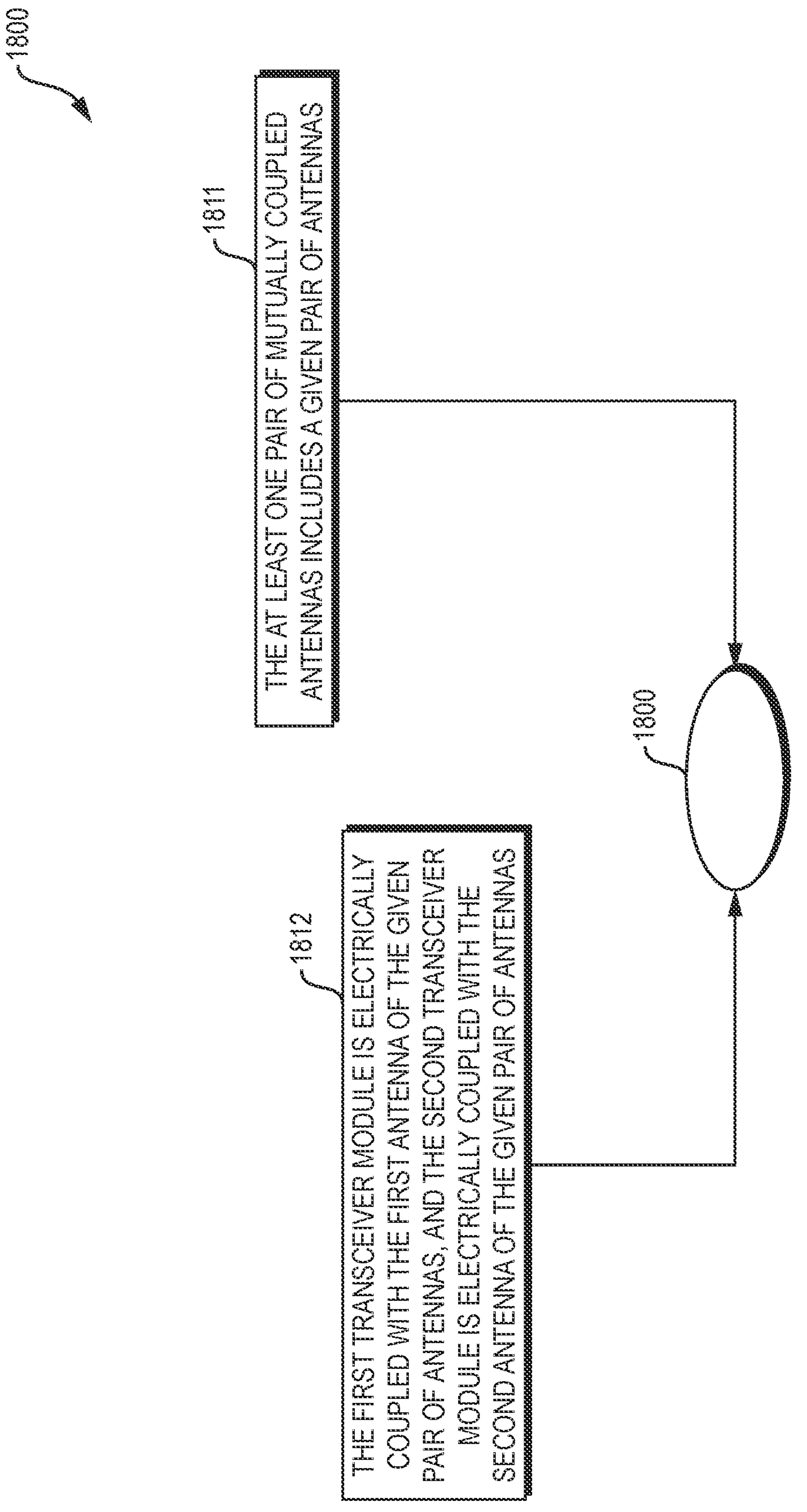

FIG. 18 is a flow diagram of an example embodiment of a method 1800 of transmitting an electronic signal in a marine environment. The method 1800 includes actions of method 1600, wherein (i) the at least one pair of mutually coupled antennas includes 1811 a given pair of antennas; and (ii) the first transceiver module is electrically coupled 1812 with the first antenna of the given pair of antennas, and the second transceiver module is electrically coupled with the second antenna of the given pair of antennas; thereby realizing a configuration as described above with respect to Arrangement 2.

Figure 19:
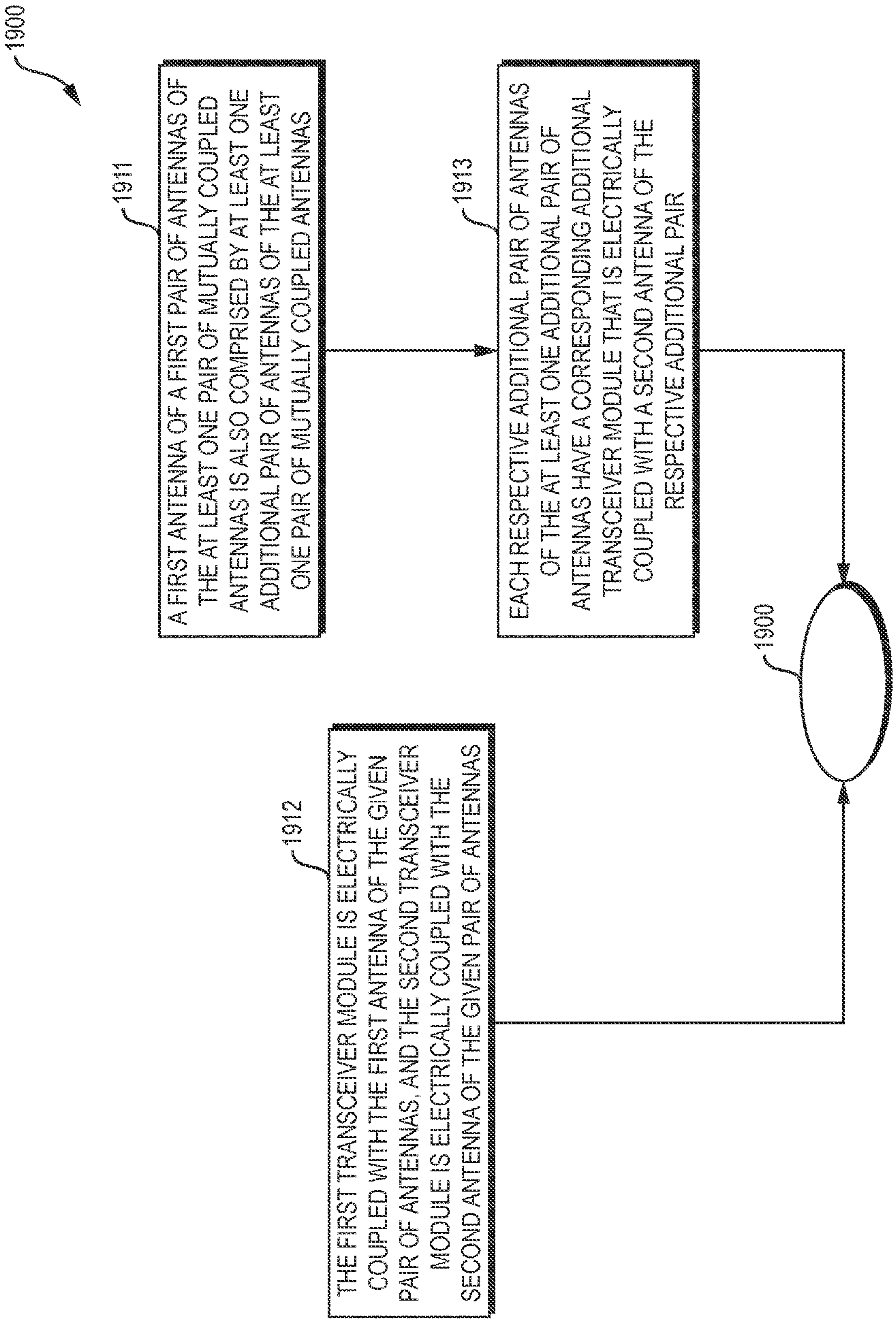

FIG. 19 is a flow diagram of an example embodiment of a method 1900 of transmitting an electronic signal in a marine environment. The method 1900 includes actions of the method 1900, wherein (i) a first antenna of a first pair of antennas of the at least one pair of mutually coupled antennas is also comprised 1911 by at least one additional pair of antennas of the at least one pair of mutually coupled antennas; (ii) the first transceiver module is electrically coupled 1912 with the first antenna of the given pair of antennas, and the second transceiver module is electrically coupled with the second antenna of the given pair of antennas; and (iii) each respective additional pair of antennas of the at least one additional pair of antennas have a corresponding additional transceiver module that is electrically coupled 1913 with a second antenna of the respective additional pair; thereby realizing a configuration as described above with respect to Arrangement 4.

It should be understood that the block and flow diagrams may include more or fewer elements, be arranged or oriented differently, or be represented differently. It should be understood that implementation may dictate the block or flow diagrams and the number of block and flow diagrams illustrating the execution of embodiments disclosed herein.

The teachings of all patents, published applications, and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A marine system comprising:

at least one pair of mutually coupled antennas, each pair of the at least one pair including a first antenna and a second antenna, the first antenna disposed physically apart from the second antenna to form a separation gap therebetween, the first antenna of a given pair of the at least one pair of mutually coupled antennas, the second antenna of the given pair, or a combination of the first antenna and the second antenna of the given pair being communicatively coupled, via a non-coaxial medium, with at least one of: the first antenna and the second antenna of any and all other pairs of mutually coupled antennas; and a first transceiver module and a second transceiver module mutually configured to facilitate transmission of a signal across the separation gap via the given pair of antennas, the signal having a carrier frequency of less than 300 MHz.

2. The marine system of claim 1, wherein the separation gap, in operation of the system, is occupied by a non-metallic gap material.

3. The marine system of claim 1, wherein:

the at least one pair of mutually coupled antennas includes a first pair and a second pair; and the non-coaxial medium includes a waterproof cable assembly including a first connector and a second connector, the first connector electrically coupled with the second antenna of the first pair of antennas, the second connector electrically coupled with the second antenna of the second pair of antennas.

4. The marine system of claim 3, wherein:

the first transceiver module is electrically coupled with the first antenna of the first pair of antennas; and the second transceiver module is electrically coupled with the first antenna of the second pair of antennas.

5. The marine system of claim 4, further comprising:

at least one additional transceiver module;

wherein:

the at least one pair of mutually coupled antennas further includes at least one additional pair;

each transceiver module of the at least one additional transceiver module is respectively electrically coupled with a corresponding first antenna of the at least one additional pair of antennas; and the waterproof cable assembly includes at least one additional connector, each connector of the at least one additional connector respectively electrically coupled with a corresponding second antenna of the at least one additional pair of antennas.

6. The marine system of claim 3, wherein the waterproof cable assembly includes a twisted-pair cable.

7. The marine system of claim 1, wherein:

the first transceiver module is electrically coupled with the first antenna of the given pair of antennas; and the second transceiver module is electrically coupled with the second antenna of the given pair of antennas.

8. The marine system of claim 1, further comprising at least one additional transceiver module and wherein:

the at least one pair of mutually coupled antennas includes a first pair of antennas and at least one additional pair of antennas, wherein, the first antenna of the first pair of antennas is also comprised by the at least one additional pair of antennas;

the first transceiver module is electrically coupled with the first antenna of the first pair of antennas of the at least one pair of mutually coupled antennas, and thereby with the first antenna of the at least one additional pair of antennas;

the second transceiver module is electrically coupled with the second antenna of the first pair of antennas of the at least one pair of mutually coupled antennas; and each transceiver module of the at least one additional transceiver module is respectively electrically coupled with a corresponding second antenna of the at least one additional pair of antennas.

9. The marine system of claim 1, wherein a dimension of the first antenna and of the second antenna is smaller than one-eighth of a wavelength corresponding to the carrier frequency of the signal.

10. The marine system of claim 1, wherein the separation gap, in operation of the system, is occupied by a non-metallic gap material and wherein the non-metallic gap material is at least one of salt water, substantially pure water, a plastic or other polymer material, wood, and air.

11. The marine system of claim 1, wherein the first transceiver module and the second transceiver module are respectively disposed within a first waterproof housing and a second waterproof housing.

12. A method of transmitting an electronic signal in a marine environment, the method comprising:

configuring at least one pair of mutually coupled antennas such that a first antenna of the at least one pair is disposed physically apart from a second antenna of the at least one pair to form a separation gap therebetween;

communicatively coupling, via a non-coaxial medium, the first antenna of a given pair of the at least one pair of mutually coupled antennas, the second antenna of the given pair, or a combination of the first antenna and the second antenna of the given pair with at least one of: the first antenna and the second antenna of any and all other pairs of mutually coupled antennas; and facilitating transmission of a signal, via the given pair of antennas, between a first transceiver module, located on a first side of the separation gap, and a second transceiver module, located on a second side of the separation gap, wherein the first side of the separation gap is an opposite side of the separation gap from the second side, the signal having a carrier frequency of less than 300 MHz.

13. The method of claim 12, further comprising occupying the separation gap by a non-metallic gap material.

14. The method of claim 12, wherein:

the at least one pair of mutually coupled antennas includes a first pair and a second pair; and the non-coaxial medium includes a waterproof cable assembly including a first connector and a second connector, the first connector electrically coupled with the second antenna of the first pair of antennas, the second connector electrically coupled with the second antenna of the second pair of antennas.

15. The method of claim 14, wherein:

the first transceiver module is electrically coupled with the first antenna of the first pair of antennas; and the second transceiver module is electrically coupled with the first antenna of the second pair of antennas.

16. The method of claim 15, wherein:

the at least one pair of mutually coupled antennas further includes at least one additional pair, a first antenna of each additional pair of the at least one additional pair having a corresponding additional transceiver module electrically coupled therewith; and the waterproof cable assembly includes at least one additional connector, each connector of the at least one additional connector respectively electrically coupled with a corresponding second antenna of the at least one additional pair of antennas.

17. The method of claim 14, wherein the waterproof cable assembly includes a twisted-pair cable.

18. The method of claim 12, wherein:

the first transceiver module is electrically coupled with the first antenna of the given pair of antennas; and the second transceiver module is electrically coupled with the second antenna of the given pair of antennas.

19. The method of claim 12, wherein:

a first antenna of a first pair of antennas of the at least one pair of mutually coupled antennas is also comprised by at least one additional pair of antennas of the at least one pair of mutually coupled antennas;

the first transceiver module is electrically coupled with the first antenna of the first pair of antennas of the at least one pair of mutually coupled antennas, and thereby with a first antenna of the at least one additional pair of antennas;

the second transceiver module is electrically coupled with a second antenna of the first pair of antennas of the at least one pair of mutually coupled antennas; and each respective additional pair of antennas of the at least one additional pair of antennas has a corresponding additional transceiver module that is electrically coupled with a second antenna of the respective additional pair.

20. The method of claim 12, wherein a dimension of the first antenna and of the second antenna is smaller than one-eighth of a wavelength corresponding to the carrier frequency of the signal.

21. The method of claim 12, further comprising occupying the separation gap by a non-metallic gap material and wherein the non-metallic gap material is at least one of salt water, substantially pure water, a plastic or other polymer material, wood, and air.

22. The method of claim 12, wherein the first transceiver module and the second transceiver module are respectively disposed within a first waterproof housing and a second waterproof housing.

* * * * *